(12) United States Patent
Nam et al.

(10) Patent No.: US 11,595,897 B2
(45) Date of Patent: Feb. 28, 2023

(54) WIRELESS COMMUNICATION ADDRESSING CONFLICTS WITH A WAKE-UP SIGNAL

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/848,670

(22) Filed: Apr. 14, 2020

(65) Prior Publication Data
US 2020/0367167 A1 Nov. 19, 2020

Related U.S. Application Data

(60) Provisional application No. 62/848,390, filed on May 15, 2019.

(51) Int. Cl.
*H04W 72/04* (2009.01)
*H04W 4/00* (2018.01)
(Continued)

(52) U.S. Cl.
CPC ......... *H04W 52/0229* (2013.01); *H04W 8/24* (2013.01); *H04W 24/08* (2013.01); *H04W 76/28* (2018.02)

(58) Field of Classification Search
CPC . H04W 76/28; H04W 74/00; H04W 52/0206; H04W 52/0235; H04W 76/27;
(Continued)

(56) References Cited

U.S. PATENT DOCUMENTS 8,452,311 B1 5/2013 Leshets et al.
10,904,861 B2 1/2021 Hwang et al.
(Continued)

FOREIGN PATENT DOCUMENTS

WO 2018174635 A1 9/2018
WO 2018175760 A1 9/2018
(Continued)

OTHER PUBLICATIONS

International Search Report and Written Opinion—PCT/US2020/028226—ISA/EPO—dated Jul. 16, 2020.

*Primary Examiner* — Khaled M Kassim
*Assistant Examiner* — Jason A Harley
(74) *Attorney, Agent, or Firm* — Procopio, Cory, Hargreaves & Savitch LLP/Qualcomm

(57) ABSTRACT

A method, a computer-readable medium, and an apparatus are provided for wireless communication at a base station. The apparatus configures a UE with wake-up signal (WUS) resources to monitor for receiving a WUS during a WUS occasion associated with a discontinuous reception (DRX) operation. The apparatus determines a conflict with the WUS occasion, and in response to determining the conflict, determines an action associated with a WUS transmission. A method, a computer-readable medium, and an apparatus are provided for wireless communication at a UE. The apparatus receives a configuration for WUS resources to monitor for a WUS during a WUS occasion associated with a DRX operation. The apparatus determines a conflict with the WUS occasion, and in response to determining the conflict, determines an action associated with WUS monitoring during the WUS occasion.

27 Claims, 16 Drawing Sheets

(51) Int. Cl.
 *H04W 68/02* (2009.01)
 *H04W 52/02* (2009.01)
 *H04W 76/28* (2018.01)
 *H04W 8/24* (2009.01)
 *H04W 24/08* (2009.01)

(58) Field of Classification Search
 CPC . H04W 72/0446; H04L 1/1887; H04B 7/0617
 USPC .......................................................... 370/329
 See application file for complete search history.

(56) References Cited

U.S. PATENT DOCUMENTS

| | | | |
|---|---|---|---|
| 2017/0280392 A1* | 9/2017 | Segev | H04W 52/0235 |
| 2018/0279274 A1* | 9/2018 | Sun | H04L 1/1864 |
| 2019/0150114 A1* | 5/2019 | Liu | H04W 76/27 |
| | | | 370/252 |
| 2019/0239189 A1* | 8/2019 | Hwang | H04W 52/0216 |
| 2019/0254110 A1* | 8/2019 | He | H04L 41/0896 |
| 2020/0037396 A1* | 1/2020 | Islam | H04W 52/0229 |
| 2020/0137682 A1* | 4/2020 | Jia | H04W 52/02 |
| 2020/0145921 A1* | 5/2020 | Zhang | H04W 76/27 |
| 2020/0229095 A1* | 7/2020 | Shrestha | H04W 52/0235 |
| 2020/0351784 A1* | 11/2020 | Tsai | H04L 5/0094 |
| 2020/0359314 A1* | 11/2020 | Wu | H04W 52/0235 |

FOREIGN PATENT DOCUMENTS

| | | |
|---|---|---|
| WO | 2019033112 A1 | 2/2019 |
| WO | 2020130930 A1 | 6/2020 |
| WO | WO-2020223966 A1 * 11/2020 | ........ H04W 52/0216 |

\* cited by examiner

WIRELESS COMMUNICATION ADDRESSING CONFLICTS WITH A WAKE-UP SIGNAL

CROSS REFERENCE TO RELATED APPLICATION(S)

This application claims the benefit of U.S. Provisional Application Ser. No. 62/848,390, entitled "Wireless Communication Addressing Conflicts with a Wake-Up Signal" and filed on May 15, 2019, which is expressly incorporated by reference herein in its entirety.

BACKGROUND

Technical Field

The present disclosure relates generally to communication systems, and more particularly, to a wireless communication involving discontinuous reception (DRX).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus configures a user equipment (UE) with wake-up signal (WUS) resources to monitor for receiving a WUS during a WUS occasion associated with a discontinuous reception (DRX) operation. The apparatus determines a conflict with the WUS occasion and an active time for the UE or other resources for the UE having a higher priority than the WUS resources. In response to determining the conflict, the apparatus determines an action associated with a WUS transmission.

In another aspect of the disclosure, a method, a computer-readable medium, and an apparatus are provided for wireless communication at a UE. The apparatus receives a configuration for WUS resources to monitor for a WUS during a WUS occasion associated with a DRX operation. The apparatus determines a conflict with the WUS occasion and an active time for the UE or other resources for the UE having a higher priority than the WUS resources. In response to determining the conflict, the apparatus determines an action associated with WUS monitoring during the WUS occasion.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
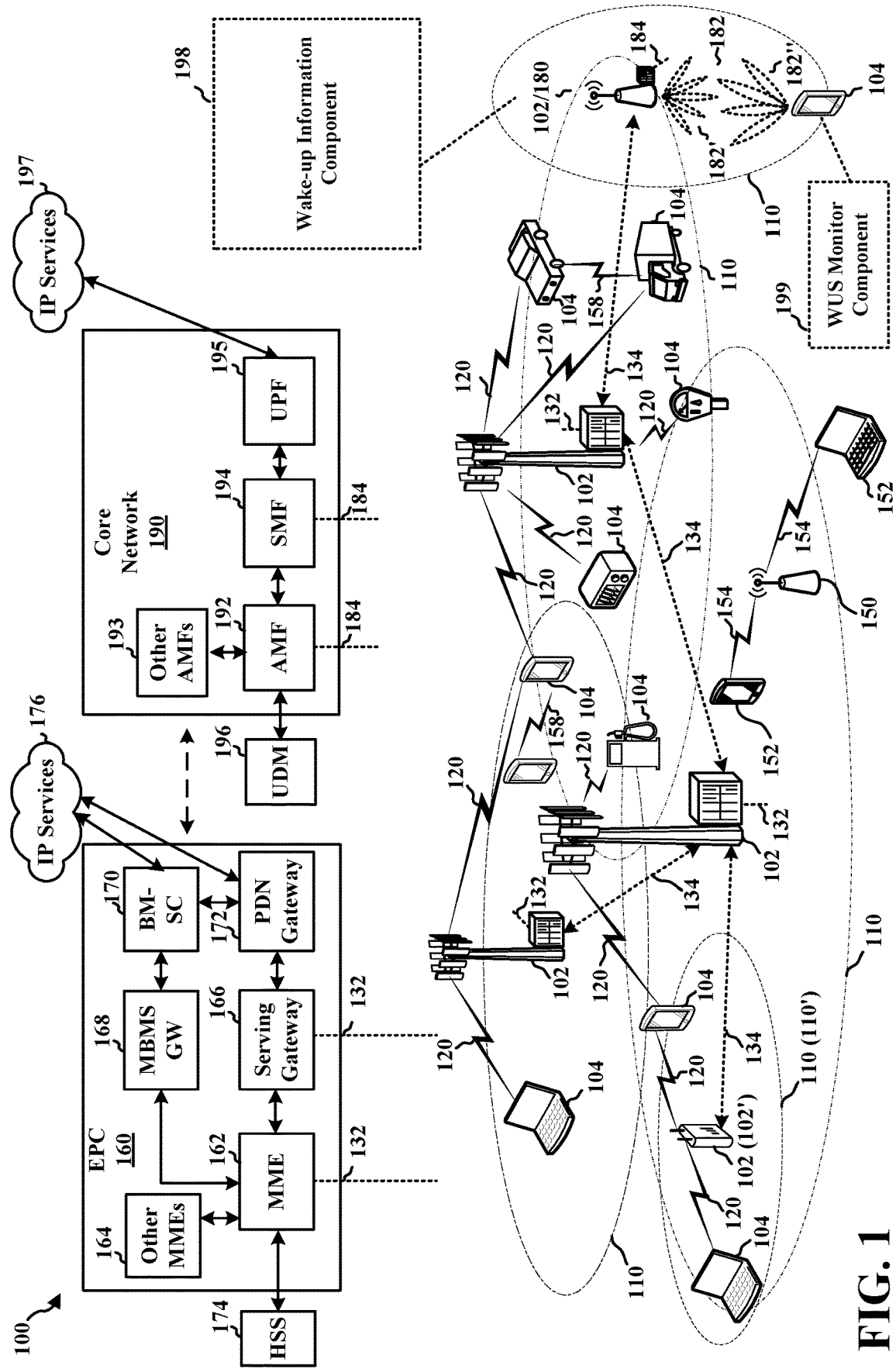
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may comprise a wake-up information component 198 that is configured to configure a UE with WUS resources to monitor for a WUS during a WUS occasion associated with a DRX operation. The wake-up information component 198 may be configured to determine a conflict with a WUS occasion and, in response to determining the conflict, determine an action associated with a WUS transmission. The conflict may be a conflict between the WUS and an active time for the UE. The conflict may be a conflict between the WUS and other resources for the UE having a higher priority than the WUS resources. In certain aspects, UE 104 may comprise a WUS component 199 configured to receive a configuration of WUS resources to monitor for a WUS during a WUS occasion associated with a DRX operation. The WUS component 199 may be configured to determine a conflict with a WUS occasion and, in response to determining the conflict, determine an action associated with WUS monitoring during the WUS occasion. The conflict may be a conflict between the WUS and an active time for the UE. The conflict may be a conflict between the WUS and other resources for the UE having a higher priority than the WUS resources. Although the following description may be focused on 5G NR, the concepts described herein may be applicable to other similar areas, such as LTE, LTE-A, CDMA, GSM, and other wireless technologies.

Figure 2:
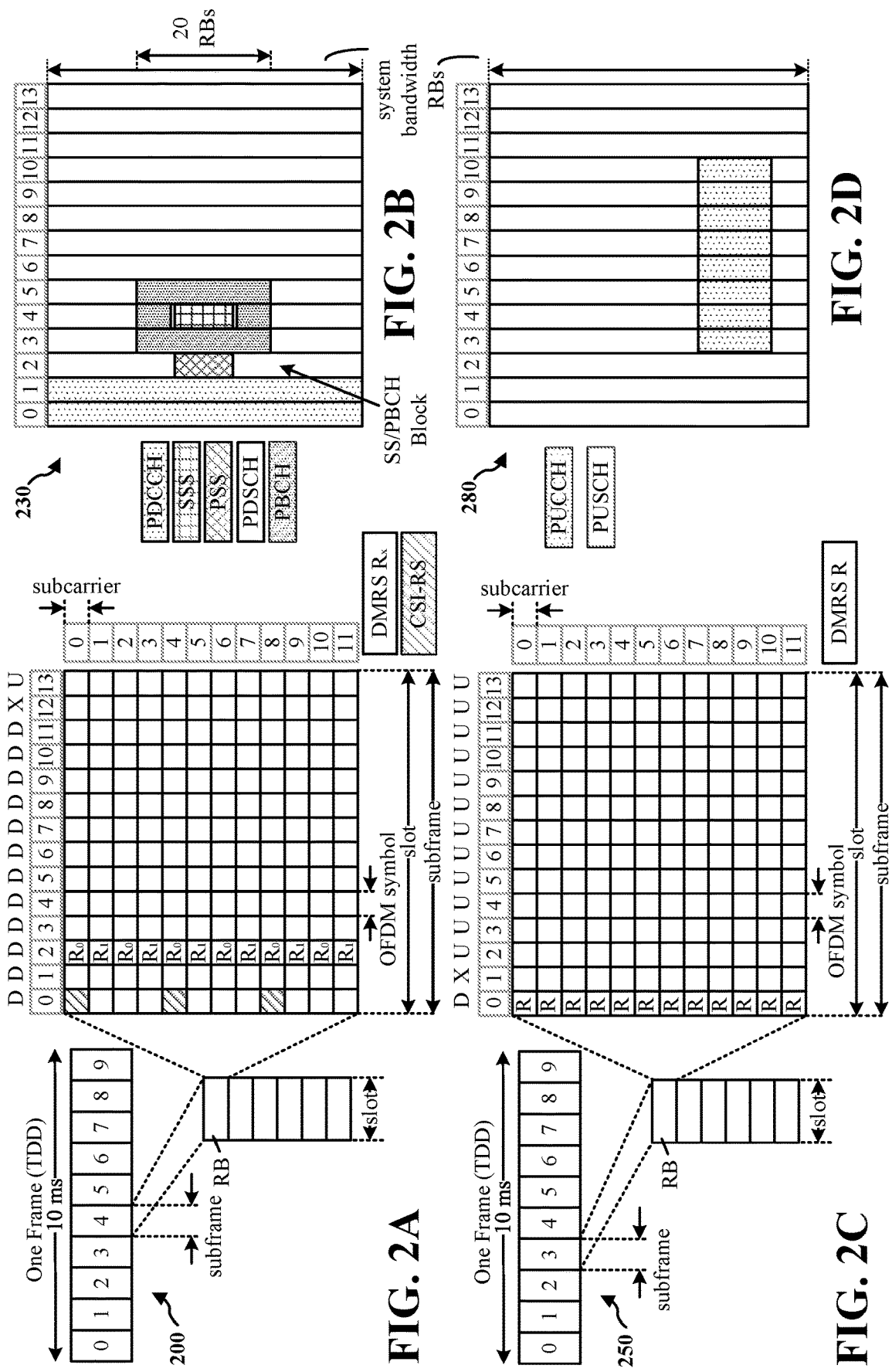
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
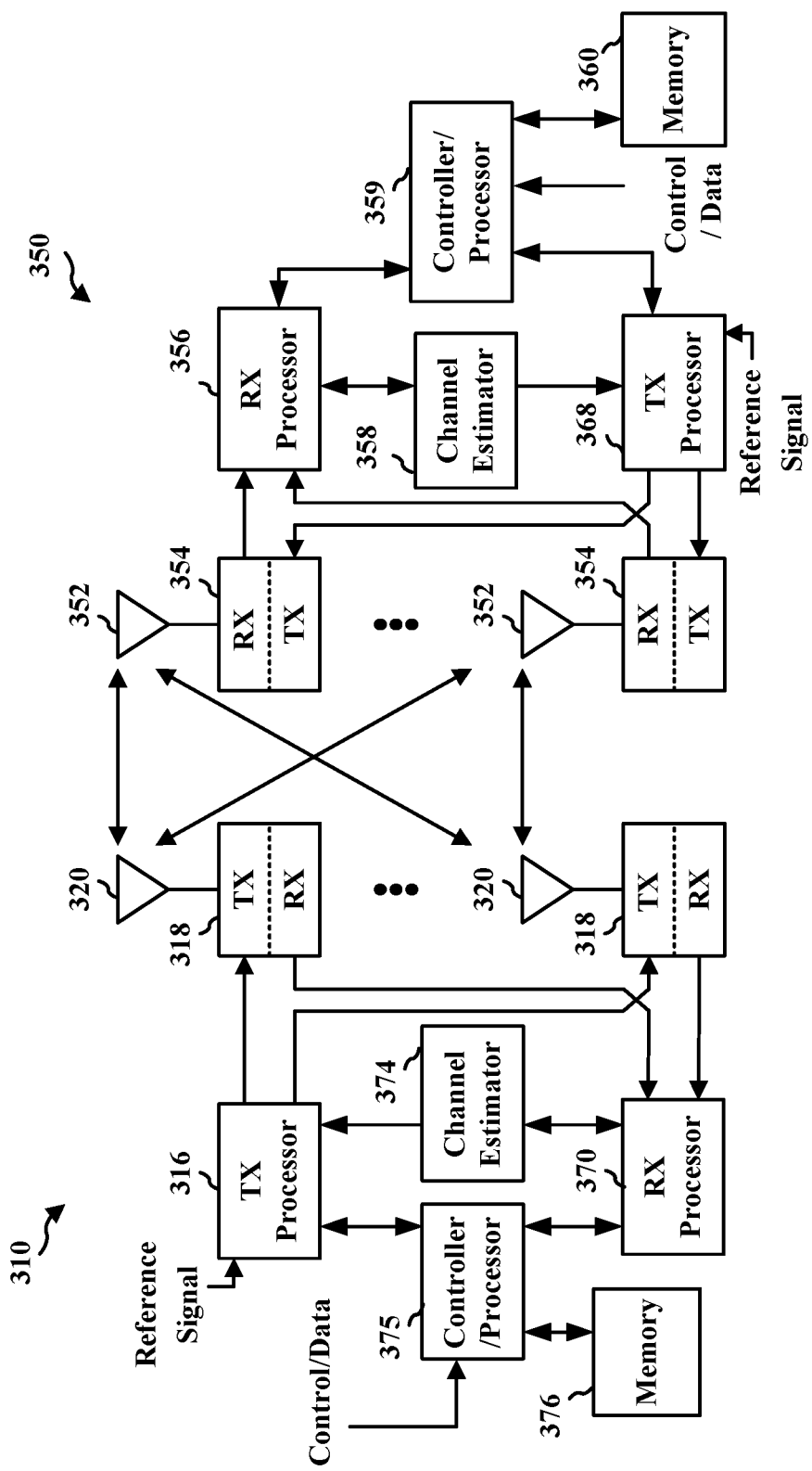
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

A UE may be configured by a base station for a discontinuous reception (DRX) mode.

Figure 4:
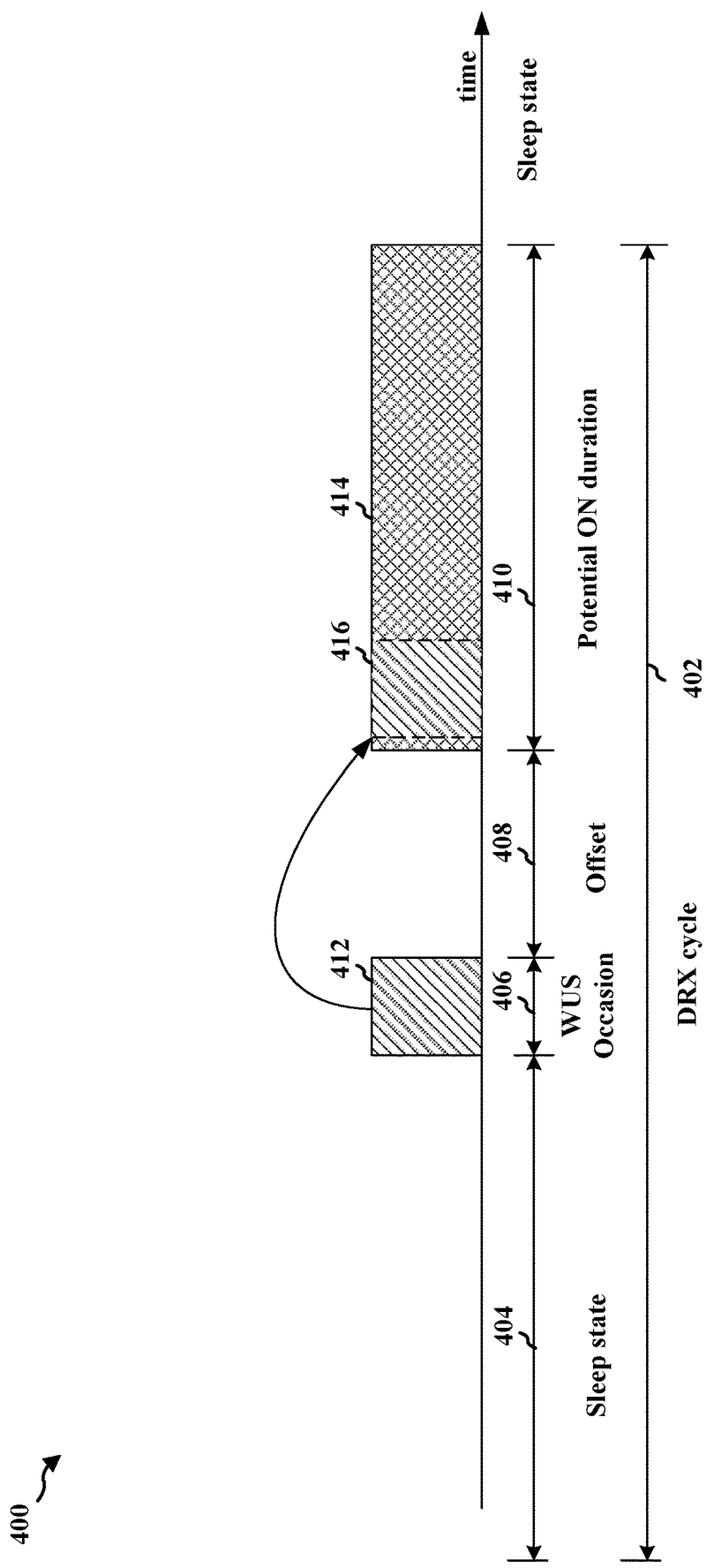
FIG. 4 illustrates an example timeline for DRX communication.

When there is no data to be transmitted between the UE and base station in either direction, e.g., no uplink or downlink transmissions, the UE may enter the DRX mode in which the UE may monitor a control channel discontinuously using a sleep and wake cycle. DRX conserves battery power at the UE for improved power efficiency. Without DRX, the UE would monitor the control channel in every slot/subframe to check whether there is data for the UE. Continuous monitoring of the control channel places a demand on the UE's battery power. FIG. 4 illustrates an example timeline 400 of a DRX cycle 402. As illustrated in FIG. 4, the DRX cycle 402 may comprise a duration during which the UE remains in a sleep state 404 and an on-duration 410.

The base station may send a wake-up signal (WUS) 412 to a UE in advance of an on-duration 410 when the base station will transmit communication 414 to the UE. If the UE receives a WUS 412 during a WUS occasion 406, the UE may wake-up by preparing to receive the communication during the corresponding on-duration 410. If the UE does not receive a WUS 412 at the WUS occasion 406, the UE may return to the sleep mode. The use of a WUS may help to reduce the chance of a UE unnecessarily waking up. An unnecessary wake up may involve a UE monitoring for a control channel scheduling data during the on-duration 410 when no data is scheduled for the UE. Instead, when a UE does not receive a WUS at WUS occasion, the UE may return to the sleep mode and conserve power.

The WUS may carry wake-up information comprising one or more of a wake-up indication, a bandwidth part identifier, a carrier identifier, and/or a request for a channel state report from the UE. The UE may start an on-duration timer as part of waking up.

The DRX configuration may be configured by the network in RRC signaling from a base station, e.g. in an RRC Connection Setup request or an RRC connection reconfiguration request. A DRX configuration may include the configuration of any of a number of timers and values, e.g., any of an On-duration Timer, a DRX Inactivity Timer, a DRX DL Retransmission Timer, a DRX UL Retransmission Timer, a long DRX Cycle, a value of the DRX Start Offset, a DRX Short Cycle Timer, and/or a short DRX Cycle, etc. A DRX Cycle may comprise a periodic repetition of On-duration in which the UE monitors PDCCH and an OFF Duration, which may be referred to as a DRX opportunity. During the OFF duration, the UE does not monitor for PDCCH. The UE may enter a sleep mode or low power mode in which the UE minimizes power consumption by shutting down a radio frequency (RF) function without detecting communication from the base station.

As an example, a DRX Inactivity Timer may indicate a time, e.g., in terms of TTI duration, after the UE successfully decodes PDCCH when the UE may again enter the OFF Duration. An On-duration Timer may indicate an amount of time during which the UE monitors for communication from the base station when the UE wakes up from the OFF duration in DRX Cycle. For example, the on-duration timer may give the number of consecutive PDCCH subframe(s) be monitored/decoded when the UE wakes up from the OFF duration in DRX Cycle. The UE may be considered to be in a DRX active time if at least one associated timer is running (e.g., the DRX on duration timer, the DRX inactivity timer, and/or the DRX retransmission timer) and the UE is monitoring for communication from the base station.

A WUS 412 may be signaled to a UE in different ways. For example, a WUS 412 may be based on PDCCH. In another example, the WUS 412 may be based on a reference signal, such as CSI-RS, tracking reference signal (TRS), DM-RS, etc. In another example, the WUS may be indicated using a sequence, e.g., based on a pseudo-random noise (PN) sequence, a gold sequence, a Zadoff-Chu (ZC) sequence, etc.

As illustrated in FIG. 4, the WUS occasion 406 may have different positions relative to the on-duration 410. In one example, the WUS occasion 406 may occur prior to the on-duration. For example, the WUS occasion 406 may be spaced from the on-duration 410 by an offset 408. The offset 408 may enable the UE to prepare to monitor for communication from the base station during the on-duration 410. In another example, the WUS occasion may occur during the on-duration 410. For example, WUS 416 is illustrated as occurring within on-duration 410.

The resources for receiving WUS transmissions may be configured by a base station for each UE. A particular UE would monitor for a WUS during a WUS occasion using the configured WUS resources for that particular UE. The resources configured for a UE may include any of a BWP for the WUS (e.g., which may be referred to as a WU-BWP), a CORESET for the WUS (e.g., which may be referred to as a wake up CORESET (WU-CORESET)), and/or a search space set for the WUS (e.g., which may be referred to as a WU-search space).

At times there may be a conflict for a WUS occasion for a UE. The conflict may occur in various situations. The WUS resource configured for the UE may overlap, at least partially, with resources for another signal or system resources that have a higher priority than the WUS. The other resources having the higher priority than the WUS resources may include any of radio resource management (RRM) resources, radio link monitoring (RLM) resources, beam-management resources, synchronization signal resources, physical broadcast channel (PBCH) resources, system information block resources, or paging channel resources.

In another example, of a conflict, a UE might not have enough time to transition to the configured WUS resource from a previous state of the UE, e.g., from an active state. In another example, the UE may be operating in the active state when the WUS occasion occurs, and the current active resources (e.g., active BWP) might not include the WUS resources. In another example, a current active resource might include the WUS resources, yet the current active resources may be associated with different beams (e.g., different spatial QCL parameter(s)) than the WUS resources for the WUS occasion. Any of these examples may involve a conflict that limits the UE's ability to monitor the configured WUS resources during a WUS occasion.

Figure 5:
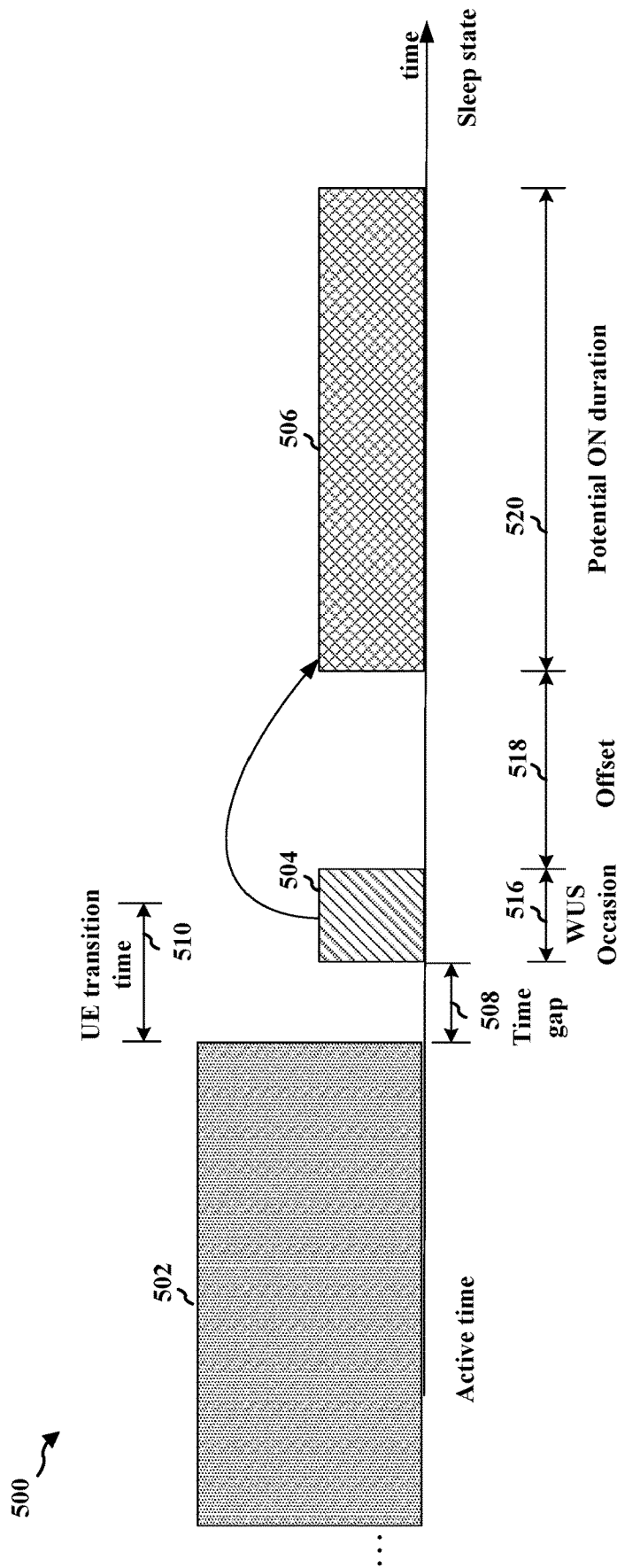
FIG. 5 illustrates an example conflict for a WUS transmission.

FIG. 5 illustrates an example 500 of a conflict in which the UE may not have enough transition time between a state of the UE and a WUS occasion. In FIG. 5, the UE may be operating in an active state during active time 502. In the example 500, a time gap 508 between the end of the active time 502 and WUS occasion 516 is smaller than a transition time 510 required by the UE to transition from the active time/active state to monitoring for the WUS 504 during the WUS occasion 516. Thus, the UE may not be able to receive a WUS 504 transmitted by the base station using the configured WUS resources during the WUS occasion. The UE may miss the WUS 504 and may not be aware that the UE should monitor for communication 506 during the on-duration 520 following offset 518. The UE may switch the resources being monitored for the active time to WUS resources configured for the WUS. For example, the UE may switch to monitoring a different BWP, a different CORESET, a different search space, and/or a different beam. In an example, the transition time 510 may correspond to a BWP switching delay. In another example, the transition time 510 may be specific to a transition to the configured WUS resource(s).

Figure 6:
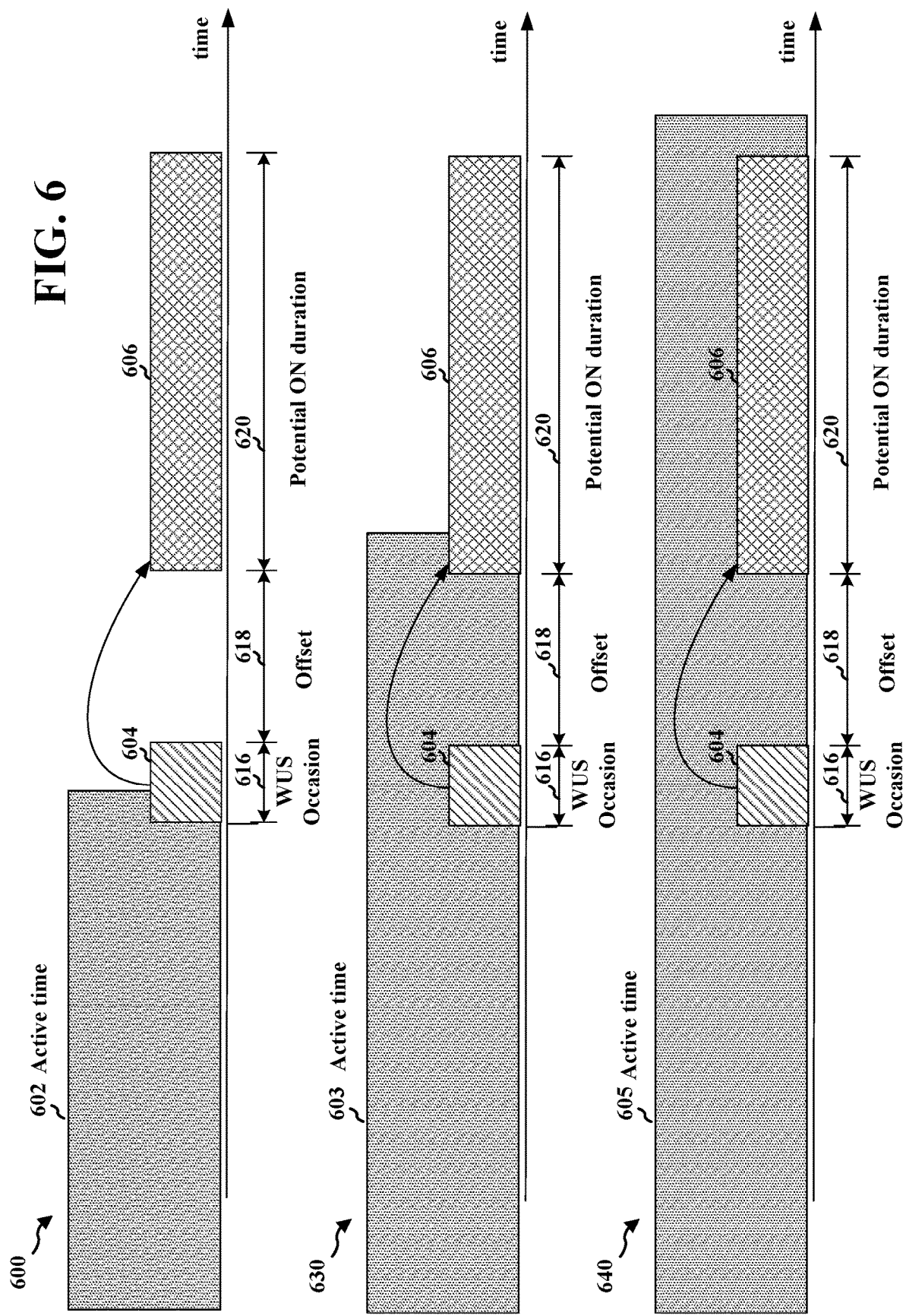
FIG. 6 illustrates example conflicts for a WUS transmission.

FIG. 6 illustrates three examples 600, 630, and 640 of conflicts that may occur when a previous active time overlaps, at least partially, in time with the WUS occasion 616. In example 600, the active time 602 partially overlaps the WUS occasion 616. In example 630, the active time 603 fully overlaps the WUS occasion 616 and also partially overlaps the corresponding on-duration 620 following offset 618. In example 640, the active time 605 fully overlaps the WUS occasion 616, the offset 618, and the potential on-duration 620. In each of the examples, the overlap of the active time 602, 603, or 605 may limit the UE's ability to receive WUS 604 during the WUS occasion 616, and therefore, the UE's ability to know to monitor for communication 606 during the on-duration 620. As an example, the frequency resources for the active time may be different than the WUS resources configured for the UE. The resources may overlap or may be completely separate. For example, the frequency resource for the active time 602, 603, 605 may correspond to the current active BWP that the UE monitors. The current active BWP may include the configured WUS resources configured for the UE to monitor for the WUS, such as the WU-CORESET and/or WU-search space. In another example, the current active BWP might not include the WUS resources configured for the UE to monitor for a WUS.

Figure 7:
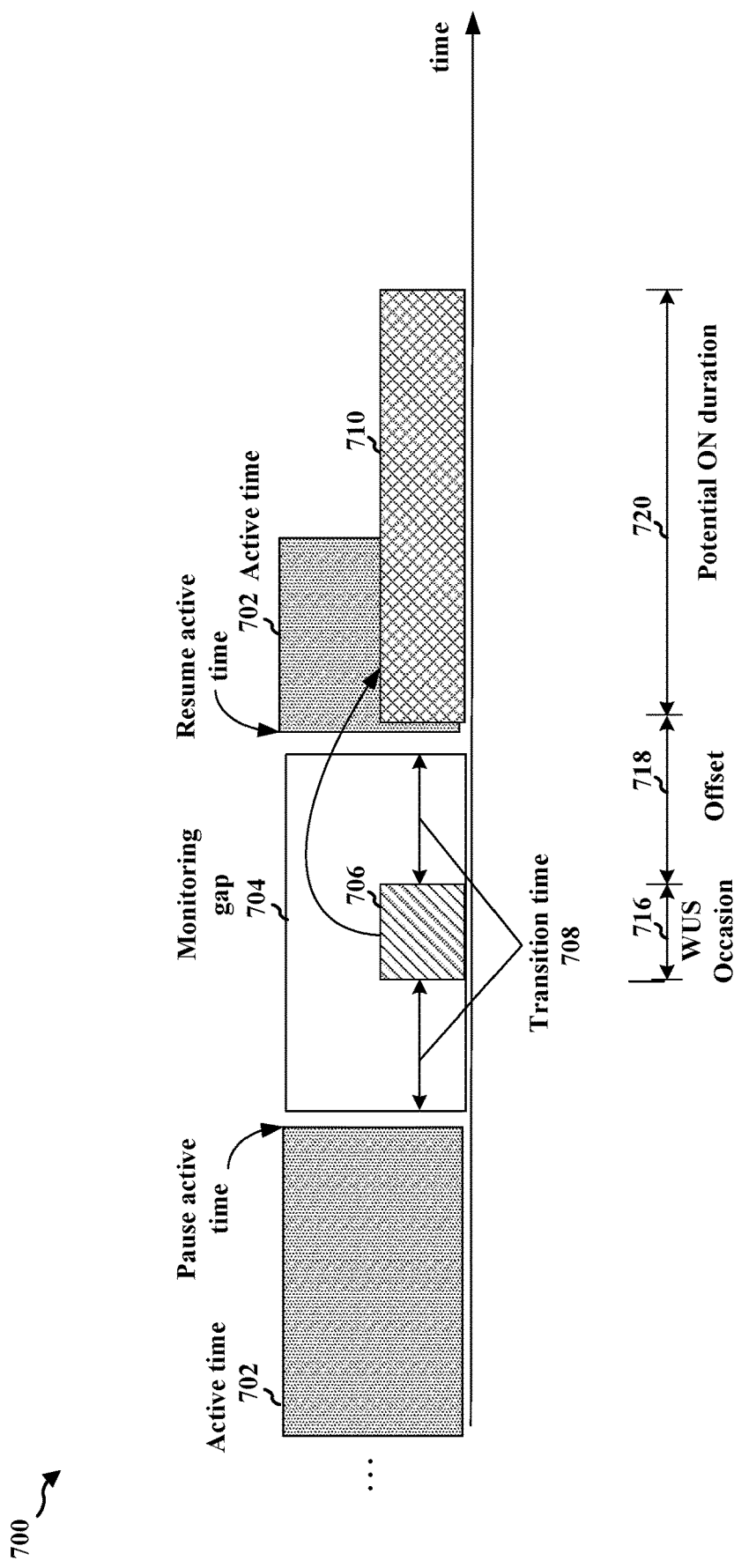
FIG. 7 illustrates an example action for addressing a conflict with a WUS occasion.

FIG. 7 illustrates an example 700 that addresses the potential conflict for the WUS occasion. In the example in FIG. 7, the base station may implicitly switch from resources for an active time 702 to the WUS resources configured for the UE during the WUS occasion 716. The base station may provide the UE with a monitoring gap 704 in order to enable the UE to monitor for WUS 706 during WUS occasion 716. The monitoring gap 704 may include a transition time 708 before and/or following the WUS occasion 716 to enable the UE to transition from monitoring for communication during active time 702 to monitoring the configured WUS resources during the WUS occasion 716. During the gap 704, the base station may refrain from sending UE-specific downlink signals for the UE and/or receiving UE-specific uplink signals from the UE. The UE-specific signal for the UE may comprise one or more of a downlink control channel, a downlink shared data channel, an uplink control channel, and an uplink shared data channel, a downlink reference signal, or an uplink reference signal for the UE. During the gap 704, the UE may stop monitoring for downlink communication other than the WUS. For example, the UE may not receive/monitor for other downlink signals such as downlink control downlink data, downlink reference signals, etc. while the UE monitors the configured WUS resources for the WUS. As illustrated in FIG. 7, if the UE is in an active state, e.g., corresponding to active time 702, the active state can be paused prior to the monitoring gap 704 and resumed following the monitoring gap. Thus, the UE may stop monitoring for communication based on the active state and may resume such monitoring following the gap 704. Similarly, the base station may stop transmitting UE specific downlink communication to the UE during the gap 704 and may resume transmitting such communication following the gap 704. The monitoring gap 704 may help the UE to have enough time to switch to monitoring the configured WUS resources in order to receive WUS 706. This enables the UE to know whether to monitor for communication 710 during the on-duration 720 following offset 718.

Figure 8:
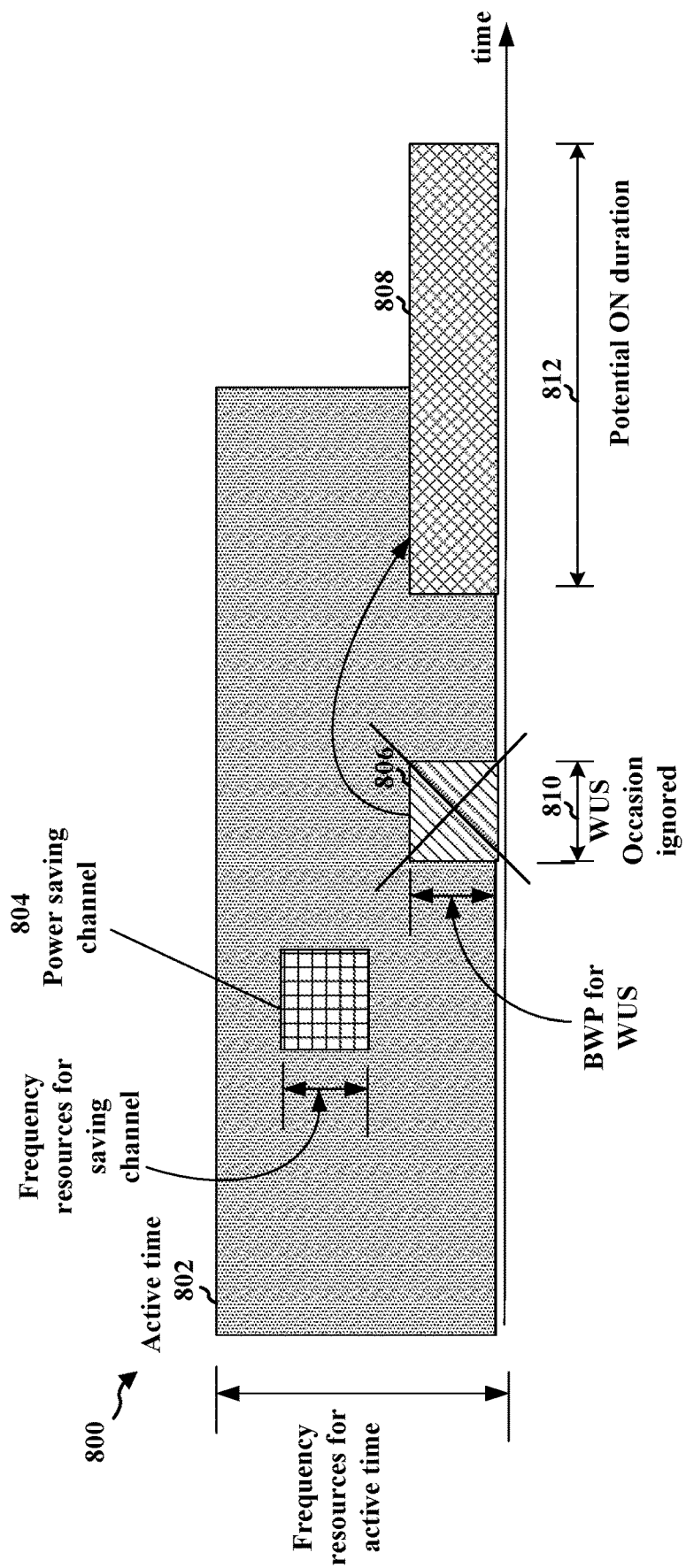
FIG. 8 illustrates an example action for addressing an overlap of an active time and a WUS occasion.

FIG. 8 illustrates another example 800 for addressing a conflict due to overlapping time resources between WUS occasion 810 and active time 802. When an active time 802 overlaps, at least partially, with a WUS occasion 810, e.g., as described in connection with FIG. 6, the base station may send wake-up information 804 to the UE to wake-up using a different channel that the WUS resources configured for the UE, e.g., a power saving channel. The power saving channel may comprise different resources than the WUS resources configured for the UE, e.g., may comprise a separate signal from the WUS. The different channel used to send the wake-up information may include a downlink control channel and/or a downlink shared data channel comprised in the communication resources for an active time for the UE. The wake-up information 804 may be sent to the UE in place of a WUS 806. Thus, the UE may ignore the WUS occasion, and may skip monitoring for the WUS 806 during the WUS occasion 810. In another example, the wake-up information 804 may be transmitted to the UE in addition to the WUS 806. The wake-up information 804 on the power saving channel may inform the UE to start the next on-duration timer, e.g., for on-duration 812. This enables the UE to know whether to monitor for communication 808 during the on-duration 812 corresponding to WUS occasion 810. The base station may configure the UE to monitor the power saving channel. The resources configured for the WUS may be included in the active time or may be separate from the resources for the active time 802. The power saving channel may comprise resources that fall within the resources for the active time 802. For example, the active BWP for the active time 802 may include multiple CORESETs. The power saving channel may be configured as a downlink control channel corresponding to any of the multiple CORESETs. Thus, the base station may use an active channel to indicate a WUS to the UE.

Figure 9:
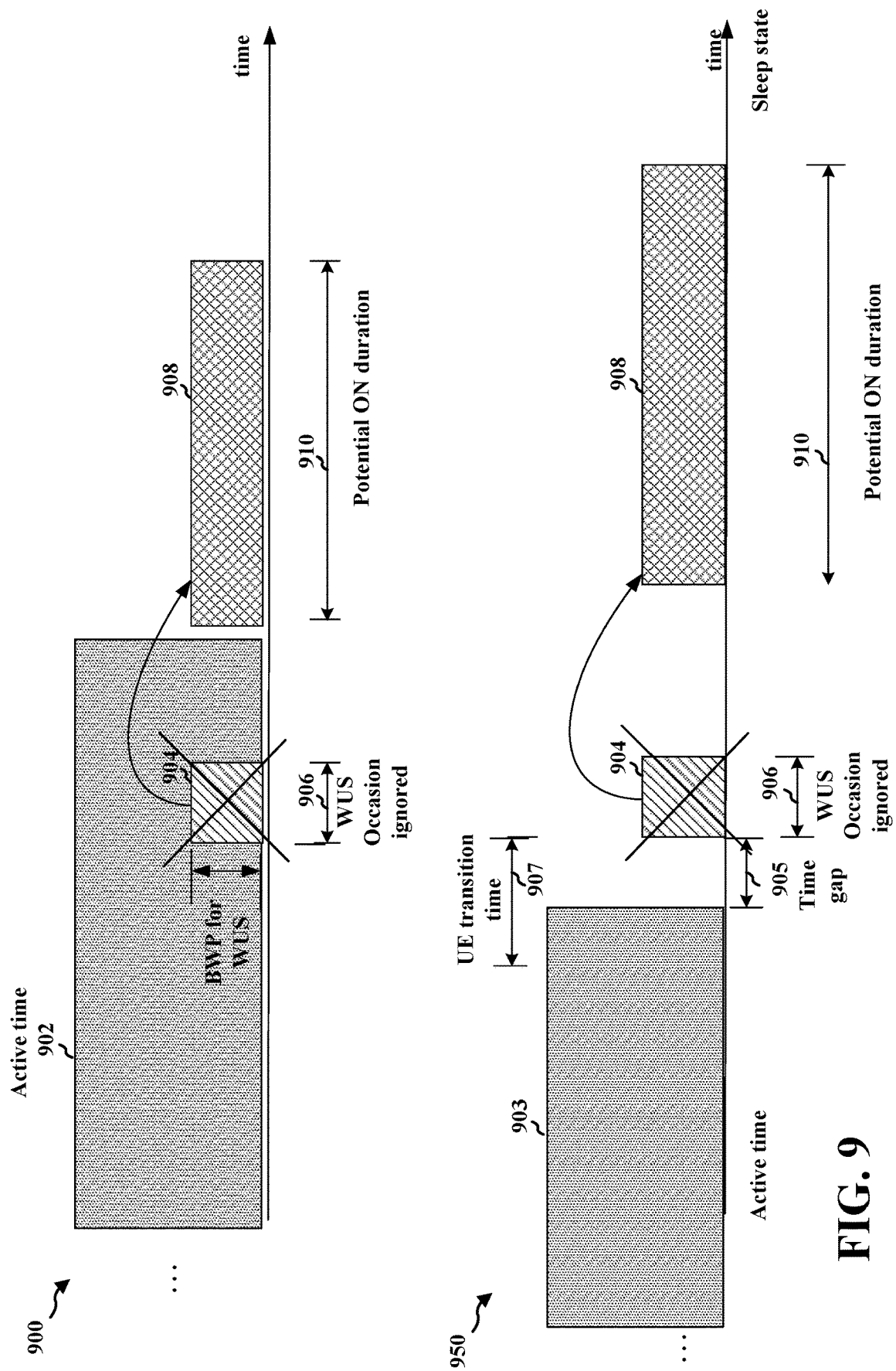
FIG. 9 illustrates an example action for addressing a conflict with a WUS occasion.

FIG. 9 illustrates other examples 900, 950 for addressing a conflict for WUS occasion 906. In example 900, the active time 902 overlaps (e.g., at least partially) with the WUS occasion 906, as described in connection with FIG. 6. In example 950, the active time 903 does not overlap the WUS occasion 906, but the time gap 905 between active time 903 and WUS occasion 906 is less than the UE transition time 907 that the UE requires to switch from the active resources during active time 903 to monitor the configured WUS resources. The base station and/or UE may identify the potential conflict. In response to detecting a conflict (based on overlapping time resources or insufficient time gap), the base station may determine to refrain from transmitting the WUS 904 during the WUS occasion 906. Thus, the base station may skip transmitting the WUS 904. The UE may also identify the conflict for the WUS occasion. The UE may respond by refraining from monitoring for the WUS during the WUS occasion 906. Thus, the UE may assume that no WUS for WUS occasion 906 is sent or may skip monitoring for the WUS 904. As the WUS is not received, the UE may assume that the on-duration timer for the next on-duration 910 is not started, and may stay in the sleep mode without monitoring for communication 908 from the base station in the corresponding on-duration 910. Likewise, the base station may refrain from transmitting communication to the UE in the corresponding on-duration 910. The active time may overlap the on-duration, and may even extend beyond the on-duration, as illustrated in example, 640. Thus, the base station may transmit communication to the UE based on the current active time 902, 903 rather than the on-duration 910.

Alternatively, in response to identifying a conflict for the WUS occasion, the UE may skip monitoring for the WUS during WUS occasion 906 and may operate as though a WUS had been received at WUS occasion 906 by preparing to receive communication during on-duration 910. The UE may monitor for communication from the base station during on-duration 910, even though the base station did not transmit a WUS and/or even though the UE did not receive the WUS. Likewise, in response to identifying the conflict for the WUS occasion for the UE, the base station may refrain from transmitting a WUS 904 during WUS occasion 906, yet may transmit communication 908 to the UE during the corresponding on-duration 910.

Thus, when the UE determines a conflict for the WUS occasion 906, the UE may assume a default configuration. The default configuration may comprise wake up information, e.g., including any of a default BWP, a default PDCCH monitoring configuration, etc. The UE may apply the default wake up information at the start of the next on-duration 910 following the skipped WUS occasion 906. The default wake up information may be configured by the base station. In another example, the UE may monitor for communication during the on-duration 910 based on resources used in previous communication, such as active time 602, 603.

Figure 10:
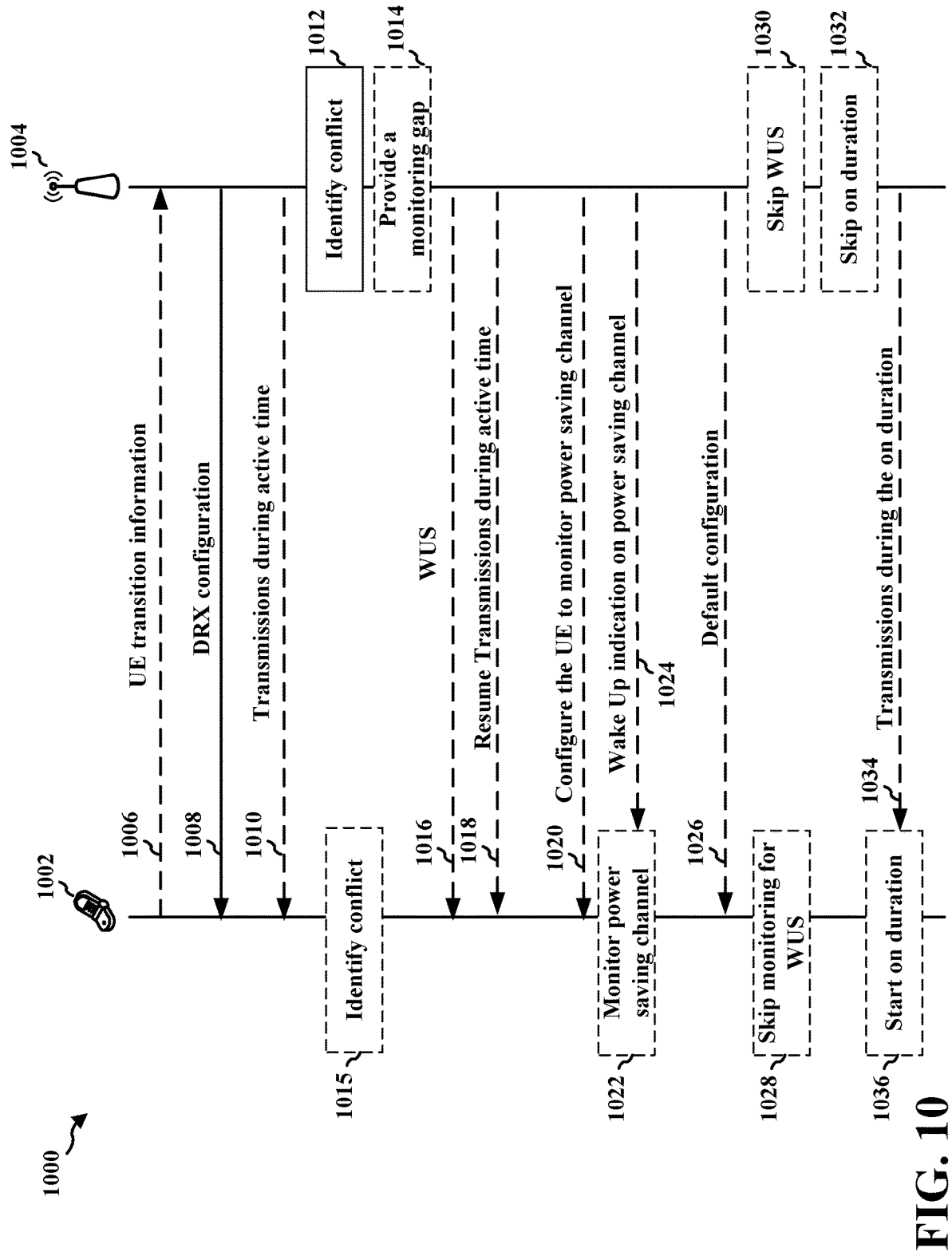
FIG. 10 is an example communication flow between a UE and a base station.

FIG. 10 illustrates example aspects of a communication flow 1000 between a UE 1002 and a base station 1004. The base station 1004 may configure the UE 1002 with a DRX configuration 1008. As described herein, the DRX configuration may configure WUS resources for the UE to monitor for a WUS as part of a DRX cycle, e.g., as described in connection with FIG. 4. The base station may identify a potential conflict for the UE for a WUS occasion, at 1012. The conflicts may be based on overlapping resources and/or insufficient transition time, e.g., as described in connection with FIGS. 5-9. Thus, the conflict may be identified based on UE transition information 1006 provided by the UE 1002 to the base station 1004. The transition information may be indicated as a UE capability, and may correspond to the time to transition to monitor for the configured WUS resources. Similarly, UE 1002 may identify the potential conflict for the WUS occasion, at 1015. The base station and/or UE may perform an action in response to identifying the conflict. For example, the base station may transmit downlink transmissions 1010 to UE 1002 during active time, e.g., as illustrated in FIGS. 5-9. In response to identifying the conflict, the base station may provide a monitoring gap for the UE, at 1014, to enable the UE to monitor the WUS resources. An example of a monitoring gap is described in connection with FIG. 7. Thus, the base station may stop downlink transmissions at least a certain amount of time prior to the WUS occasion and may transmit WUS 1016 to the UE. The base station may then resume downlink transmission to UE during an active time, at 1018. In another example, the base station may configure 1020 the UE to monitor a different channel for a wake-up indication. An example is described in connection with FIG. 8. The base station may then transmit a wake up indication 1024 to the UE on the different channel, e.g., a power saving channel. The UE may monitor the different channel, at 1022, in order to receive the wake-up indication. In another example, the base station may determine to refrain from transmitting the WUS, at 1030, when the base station identifies a conflict for a WUS occasion. Similarly, the UE may skip monitoring the WUS occasion, at 1028, when the UE identifies the conflict. Example aspects are described in connection with FIG. 9. For example, the base station may skip transmitting to the UE in the corresponding on-duration, at 1032, and the UE may skip monitoring for communication during the on-duration, e.g., the UE may refrain from starting the on-duration associated with the WUS occasion. Alternatively, the UE may start the on-duration, even though the UE did not receive the WUS. For example, the UE may monitor for communication from the base station, at 1036, during the corresponding on-duration in order to receive transmission 1034 from base station 1004. The UE may monitor for communication, at 1036, based on a default configuration 1026 received from the base station 1004 or based on a configuration for prior communication, e.g., transmissions 1010 during active time.

Figure 11:
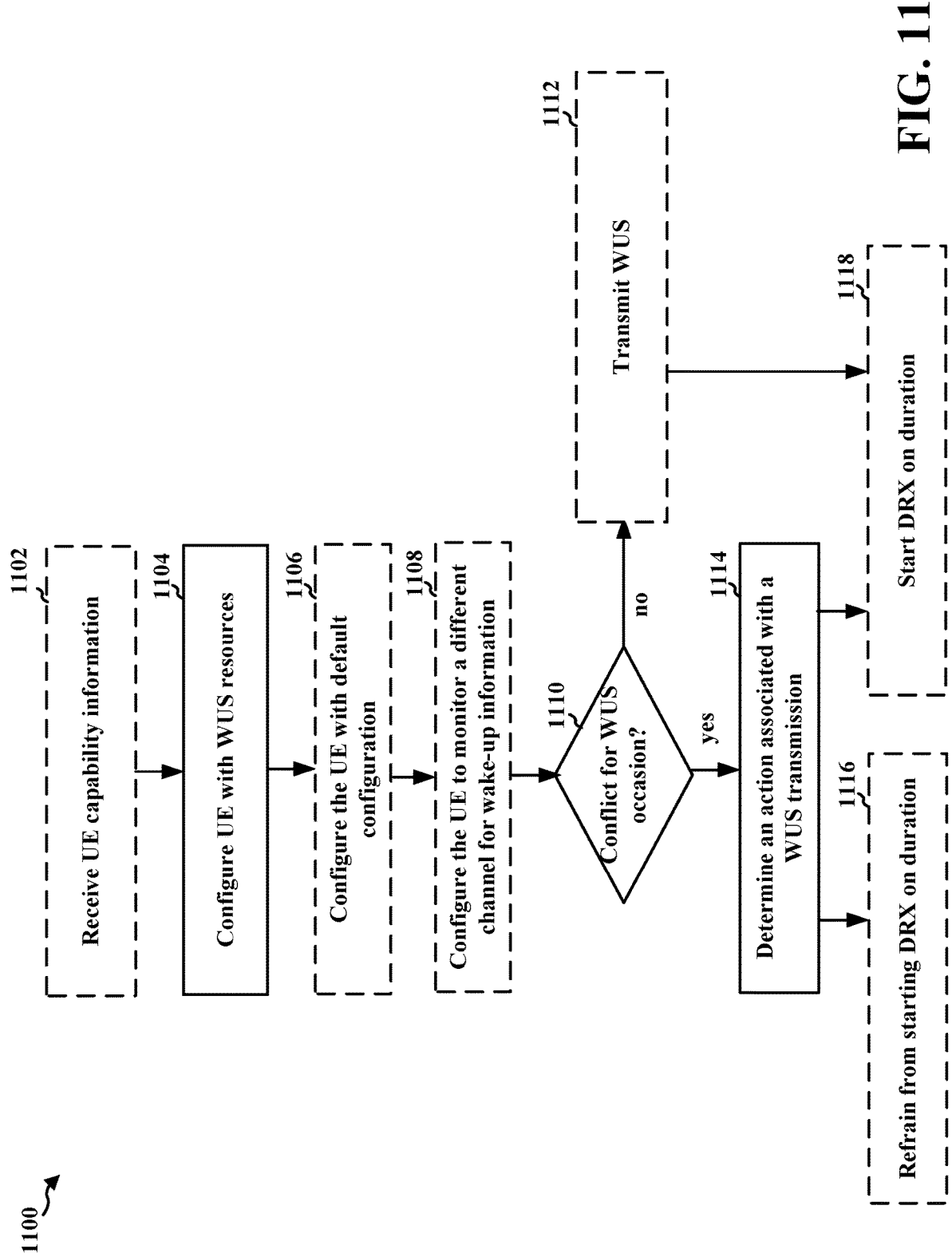
FIG. 11 is a flowchart of a method of wireless communication.

FIG. 11 is a flowchart 1100 of a method of wireless communication. The method may be performed by a base station or a component of a base station (e.g., the base station 102, 180, 310, 1104; the apparatus 1202/1202'; the processing system 1314, which may include the memory 376 and which may be the entire base station 310 or a component of the base station 310, such as the TX processor 316, the RX processor 370, and/or the controller/processor 375). The method may enable the base station to handle conflicts between a WUS and other resources, such as an active time for a UE or other resources having a higher priority than the WUS.

At 1104, the base station configures a UE with WUS resources to monitor for receiving a WUS during a WUS occasion associated with a DRX operation. The configuration may be performed, e.g., by the DRX configuration component 1208 of the apparatus 1202 in FIG. 12. The WUS may carry wake-up information comprising at least one of a wake-up indication, a bandwidth part identifier, a carrier identifier, or a request for a channel state report.

At 1110, the base station determines whether a conflict exists with a WUS occasion for the UE, e.g., as described in connection with FIGS. 5 and 6. The determination may be performed, e.g., by the determination component 1216 of the apparatus 1202 in FIG. 12. The conflict may comprise the WUS resources overlapping at least in part with communication resources during an active time for the UE, e.g., as described in connection with FIG. 6. The conflict may comprise the WUS resources overlapping at least in part with resources for the UE having a higher priority than the WUS resources, e.g., as described in connection with FIG. 10. The communication resources during the active time may be different than the WUS resources configured for the UE, e.g., might not include any WUS resources configured for the UE. The other resources having the higher priority than the WUS resources may include any of radio resource management (RRM) resources, radio link monitoring (RLM) resources, beam-management resources, synchronization signal resources, physical broadcast channel (PBCH) resources, system information block resources, and/or paging channel resources.

The conflict may comprise a gap in time between the WUS and an active time that is smaller than a threshold, e.g., as described in connection with FIG. 5. The threshold may be based on a capability of the UE and/or assistance information from the UE. The base station may receive the transition capability in UE capability information received at 1102.

If the base station does not determine a conflict, at 1110, the base station may transmit the WUS transmission to the UE 1112. The transmission may be performed by the WUS transmission component 1218 and/or the transmission component 1206 of the apparatus 1202 in FIG. 12.

In response to determining the conflict, at 1110, the base station determines an action associated with a WUS transmission, at 1114. In some examples, the determination may be performed, e.g., by the determination component, the WUS transmission component 1218, and/or the on-duration component 1220 of the apparatus 1202 in FIG. 12. in response to determining the conflict.

In an example, the action associated with the WUS transmission may comprise providing a WUS monitoring gap for the WUS occasion, e.g., as described in connection with FIG. 7. The WUS monitoring gap may also be referred to as a WUS monitoring window. The WUS monitoring gap may start prior to the WUS occasion and may extend after the WUS occasion. At, 1102, the base station may receive UE capability information or assistance information from the UE. The reception of the UE capability information may be performed, e.g., by the UE information component 1214 and/or the reception component 1204 of the apparatus 1202 in FIG. 12. The configuration of the WUS monitoring gap may be based, at least in part, on the UE capability information or the assistance information from the UE. The base station may stop sending and/or receiving UE-specific signal(s) for the UE other than the WUS during the WUS monitoring gap. The UE-specific signal for the UE may comprise one or more of a downlink control channel, a downlink shared data channel, an uplink control channel, and an uplink shared data channel, a downlink reference signal, and/or an uplink reference signal for the UE.

In another example, the action associated with the WUS transmission may comprise transmitting wake-up information to the UE on a different channel from the WUS resources configured for the UE, e.g., as described in connection with FIG. 8. For example, the WUS transmission component and/or the transmission component 1206 of the apparatus 1202 in FIG. 12 may perform the transmission of the wake-up information on a different channel. The different channel may comprise one or more of a downlink control channel and a downlink shared data channel comprised in the communication resources during an active time for the UE. The base station may configure the UE to monitor the different channel during the active time for the wake-up information, at 1108. The configuration may be performed, e.g., by the channel configuration component 1212 of the apparatus 1202 in FIG. 12.

In another example, the action associated with the WUS transmission may comprise adjusting transmission of the WUS to refrain from transmitting the WUS at the WUS occasion. Thus, the base station may refrain from transmitting a WUS, or may skip a WUS, as described in connection with FIG. 9. For example, the WUS transmission component 1218 and/or the transmission component 1206 of the apparatus 1202 in FIG. 12 may be configured to not transmit the WUS at the WUS occasion based on the conflict.

As illustrated at 1116, in response to determining the conflict, the base station may further refrain from starting an on-duration corresponding to the WUS that the base station refrained from transmitting. For example, the on-duration component 1220 of the apparatus 1202 may be configured to refrain from starting the on-duration corresponding to a WUS that the base station does not transmit.

Alternatively, as illustrated at 1118, the base station may start an on-duration even though the base station refrained from transmitting the WUS. Thus, the base station may start a DRX on-duration associated with the WUS occasion without transmitting the WUS. The base station may configure the UE with default wake-up information, at 1106, that the UE may use to monitor for communication during the on-duration. As another example, the wake-up information may be predetermined, e.g., based at least in part on a capability of the UE or assistance information from the UE. For example, the on-duration component 1220 of the apparatus 1202 may be configured to start the on-duration corresponding to a WUS that the base station does not transmit.

Figure 12:
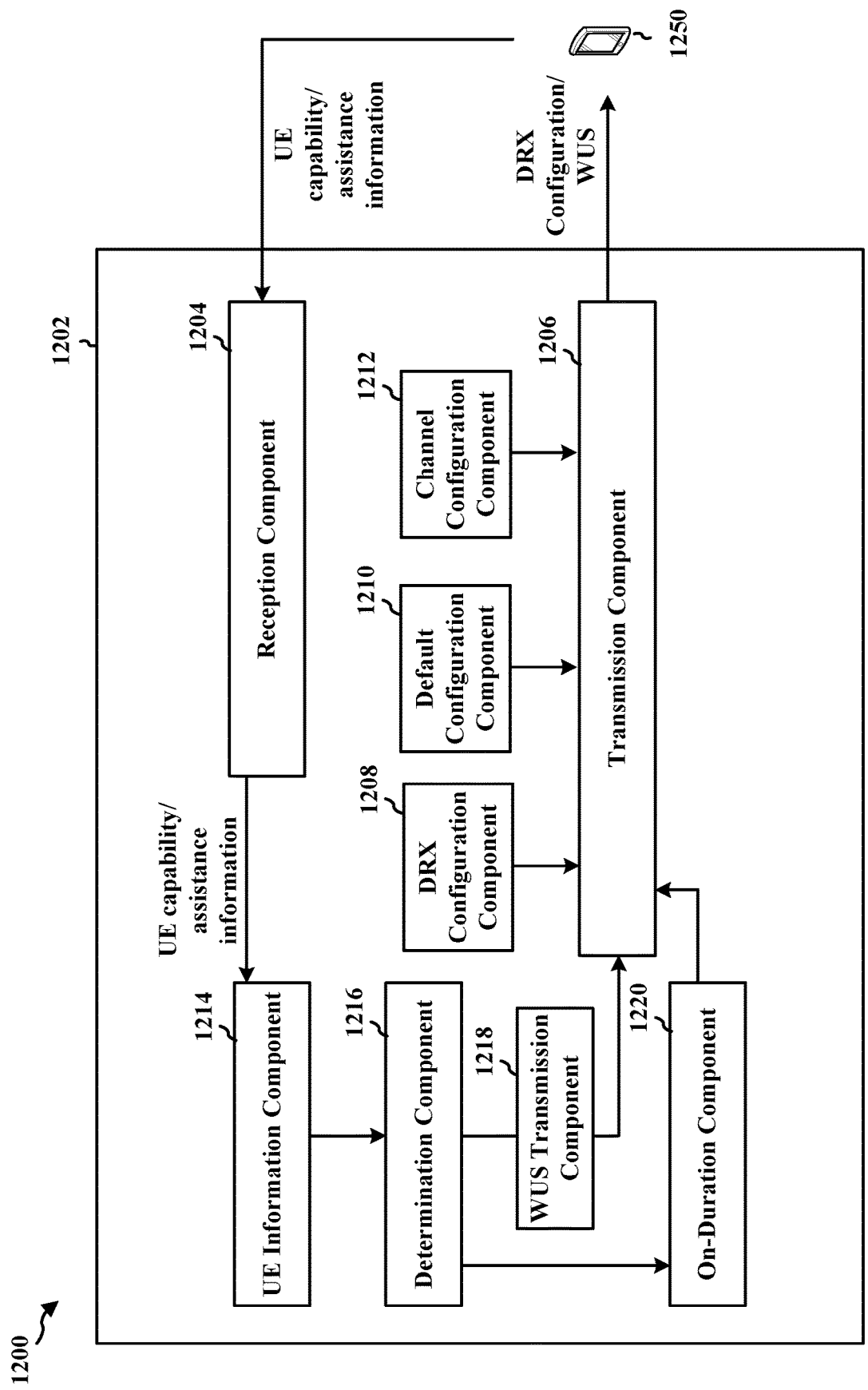
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a base station apparatus. The apparatus includes a reception component 1204 that receives uplink communication from UE and a transmission component 1206 that transmits downlink communication to the UE 1250. The apparatus includes a DRX configuration component 1208 configured to configure a UE with WUS resources to monitor for receiving a WUS during a WUS occasion associated with a DRX operation, e.g., as described in connection with 1104 in FIG. 11. The apparatus may include a default configuration component 1210 configured to configure the UE for default wake-up information, as described in connection with 1106 in FIG. 11. The apparatus may include a channel configuration component 1212 configured to configure the UE to monitor the different channel during the active time for the wake-up information, e.g., as described in connection with 1108 of FIG. 11. The apparatus may include a UE information component 1214 configured to receive a capability of the UE or assistance information of the UE, e.g., as described in connection with 1102 of FIG. 11. The apparatus may include a determination component configured 1216 configured to determine a conflict with a WUS occasion, e.g., as described in connection with 1110 in FIG. 11. The apparatus may include a WUS transmission component 1218 configured to determine an action associated with a WUS transmission, in response to determining a conflict, e.g., as described in connection with 1114 in FIG. 11. The transmission component 1106 and/or WUS transmission component 1218 may be configured to transmit a WUS to the UE and/or to transmit wake-up information to the UE on a different channel. The apparatus may include an on-duration component 1220 configured to start an on-duration or refrain from starting an on-duration, e.g., as described in connection with 1114, 1116, and 1118 of FIG. 11.

The apparatus may include additional components that perform each of the blocks of the algorithm in the aforementioned flowcharts of FIGS. 10 and 11. As such, each block in the aforementioned flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
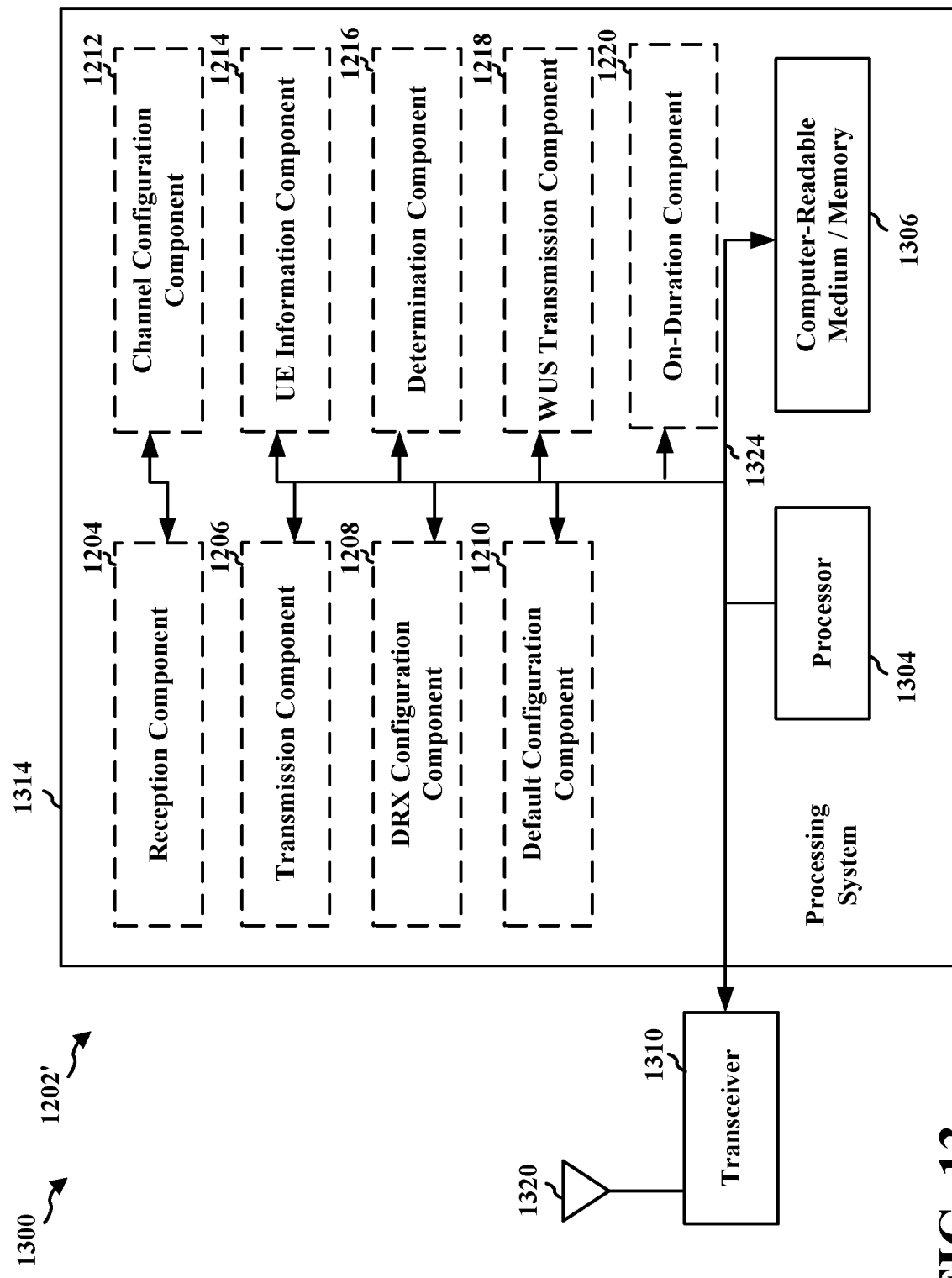
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for configuring a UE with WUS resources to monitor for receiving a WUS during a WUS occasion associated with a DRX operation, e.g., as described in connection with 1104 in FIG. 11. The apparatus may include means for determining a conflict with a WUS occasion, e.g., as described in connection with 1110 in FIG. 11, and means for determining an action associated with a WUS transmission, in response to determining the conflict, e.g., as described in connection with 1114 of FIG. 11. The apparatus may include means for receiving UE capability information or assistance information for the UE, e.g., as described in connection with 1102 of FIG. 11. The apparatus may include means for configuring the UE to monitor the different channel during the active time for the wake-up information, e.g., as described in connection with 1108 in FIG. 11. The apparatus may include means for starting (or refraining from starting) a DRX on-duration associated with a WUS, e.g., as described in connection with 1116 or 1118 in FIG. 11. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
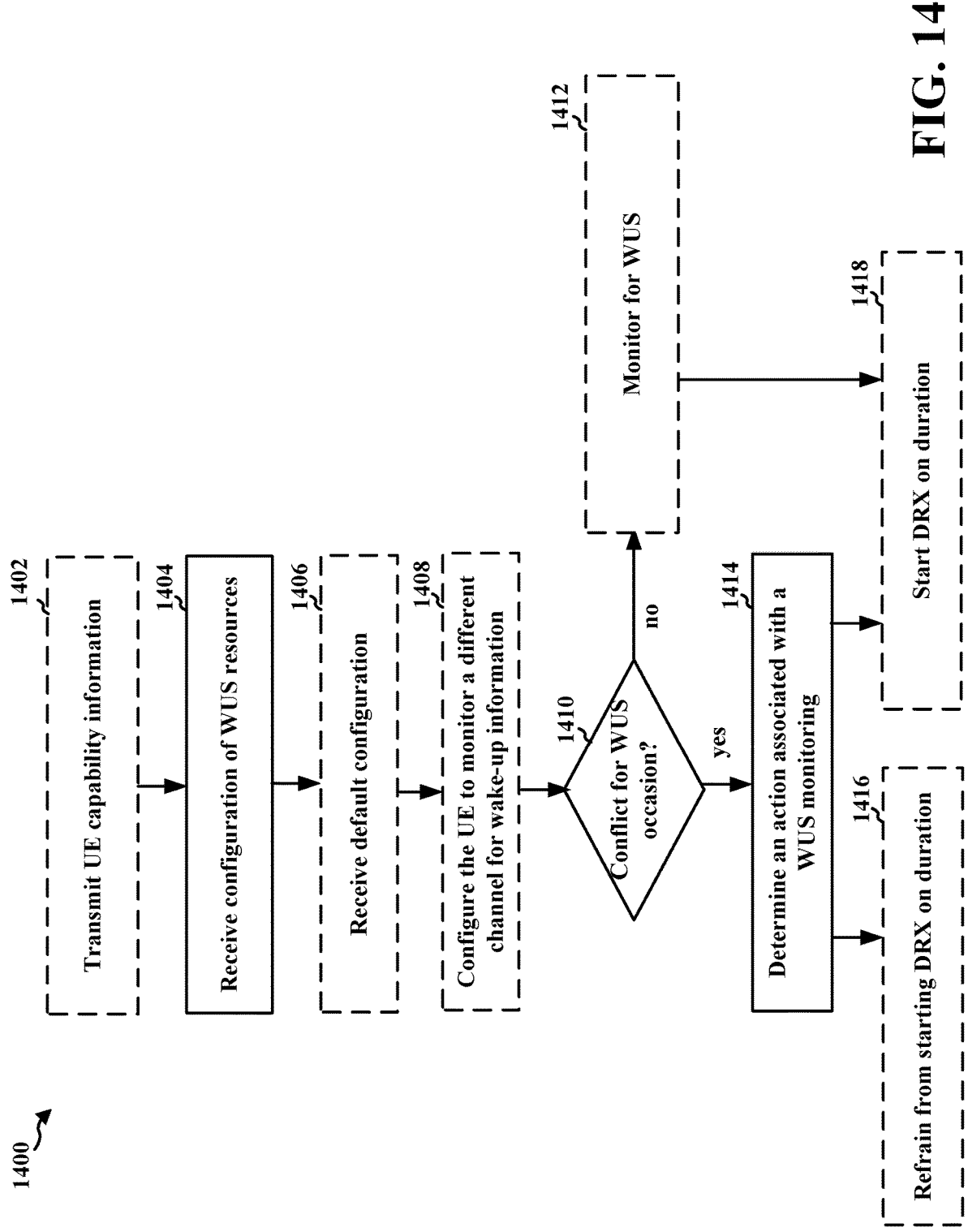
FIG. 14 is a flowchart of a method of wireless communication.

FIG. 14 is a flowchart 1400 of a method of wireless communication. The method may be performed by a UE or a component of a UE (e.g., the UE 104, 350, 1002; the apparatus 1502/1502'; the processing system 1614, which may include the memory 360 and which may be the entire UE 350 or a component of the UE 350, such as the TX processor 368, the RX processor 356, and/or the controller/processor 359. The method may enable the UE to handle conflicts between a WUS and other resources, such as an active time for a UE or other resources having a higher priority than the WUS.

At 1404, the UE receives a configuration for WUS resources to monitor for a WUS during a WUS occasion associated with a DRX operation. The reception may be performed, e.g., by the reception component 1504 and/or DRX configuration component 1508 of the apparatus 1502. The WUS may carry wake-up information comprising at least one of a wake-up indication, a bandwidth part identifier, a carrier identifier, or a request for a channel state report.

At 1110, the UE determines whether a conflict exists with a WUS occasion for the UE, e.g., as described in connection with FIGS. 5 and 6. The determination may be performed, e.g., by the determination component 1516 of the apparatus 1502 in FIG. 15. The conflict may comprise the WUS resources overlapping at least in part with communication resources during an active time for the UE or resources for the UE having a higher priority than the WUS resources, e.g., as described in connection with FIG. 6. The communication resources during the active time may be different than the WUS resources configured for the UE, e.g., might not include any WUS resources configured for the UE. The other resources having the higher priority than the WUS resources may include any of radio resource management (RRM) resources, radio link monitoring (RLM) resources, beam-management resources, synchronization signal resources, physical broadcast channel (PBCH) resources, system information block resources, and/or paging channel resources.

The conflict may comprise a gap in time between the WUS and an active time that is smaller than a threshold, e.g., as described in connection with FIG. 5. The threshold may be based on a capability of the UE and/or assistance information from the UE.

The UE may transmit the transition capability in UE capability information or assistance information for the UE at 1402. The transmission of the UE capability information may be performed, e.g., by the UE information component 1514 and/or the transmission component 1506 of the apparatus 1502. For example, the UE may transmit UE capability or assistance information to a base station, the UE capability or assistance information comprising an indication of a threshold of transition time for transitioning from transmitting or receiving communication during an active time to monitoring for a WUS occasion.

If the UE does not determine a conflict, at 1410, the UE may monitor for the WUS in a normal manner, at 1412. The monitoring may be performed, e.g., by the WUS monitor component 1518 and/or the reception component 1504 of the apparatus 1502 in FIG. 15 when the determination component 1516 does not determine the conflict.

In response to determining the conflict, at 1410, the UE determines an action associated with WUS monitoring during the WUS occasion, at 1414. The action may be performed, e.g., by the on-duration component 1520, the WUS monitor component 1518, and/or the reception component 1504.

In an example, the action associated with the WUS monitoring comprises monitoring the WUS occasion within a WUS monitoring gap provided by a base station, e.g., as described in connection with FIG. 7. The WUS monitoring gap may also be referred to as a WUS monitoring window. The WUS monitoring gap may start prior to the WUS occasion and may extend after the WUS occasion. The WUS monitoring gap may be based, at least in part, on the UE capability information or the assistance information transmitted at 1402. The UE may receive a configuration of the WUS monitoring gap from the base station based on the UE capability information or the assistance information. The UE may not expect to send and receive at least one or more or a downlink control channel, a downlink shared data channel, an uplink control channel, an uplink shared data channel, a downlink reference signal, or an uplink reference signal during the WUS monitoring gap.

In another example, the action associated with the WUS monitoring comprises receiving wake-up information from the base station on a different channel from the WUS resources configured for the UE, e.g., as described in connection with FIG. 8. The different channel may comprise one or more of a downlink control channel and a downlink shared data channel comprised in the communication resources during an active time for the UE. The UE may receive a configuration to monitor the different channel during the active time for the wake-up information, at 1408.

In another example, the action associated with a WUS monitoring comprises adjusting reception of the WUS to refrain from monitoring the WUS at the WUS occasion. Thus, the UE may refrain from monitoring for a WUS during a WUS occasion, as described in connection with FIG. 9.

As illustrated at 1416, in response to determining the conflict, the UE may further refrain from starting an on-duration corresponding to the WUS occasion that the UE refrained from monitoring. For example, the on-duration component 1520 of the apparatus 1502 in FIG. 12 may be configured to not start the on-duration corresponding to a WUS occasion that is not monitored by the UE.

Alternatively, as illustrated at 1418, the UE may start an on-duration corresponding to the WUS that the UE refrained from monitoring. Thus, the UE may start the on-duration without monitoring for the WUS during the WUS occasion. For example, the on-duration component 1520 of the apparatus 1502 in FIG. 12 may be configured to start the on-duration corresponding to a WUS occasion that is not monitored by the UE. The UE may receive a configuration with default wake-up information, at 1406, that the UE may use to monitor for communication during the on-duration. As another example, the wake-up information may be predetermined, e.g., based at least in part on a capability of the UE or assistance information from the UE.

Figure 15:
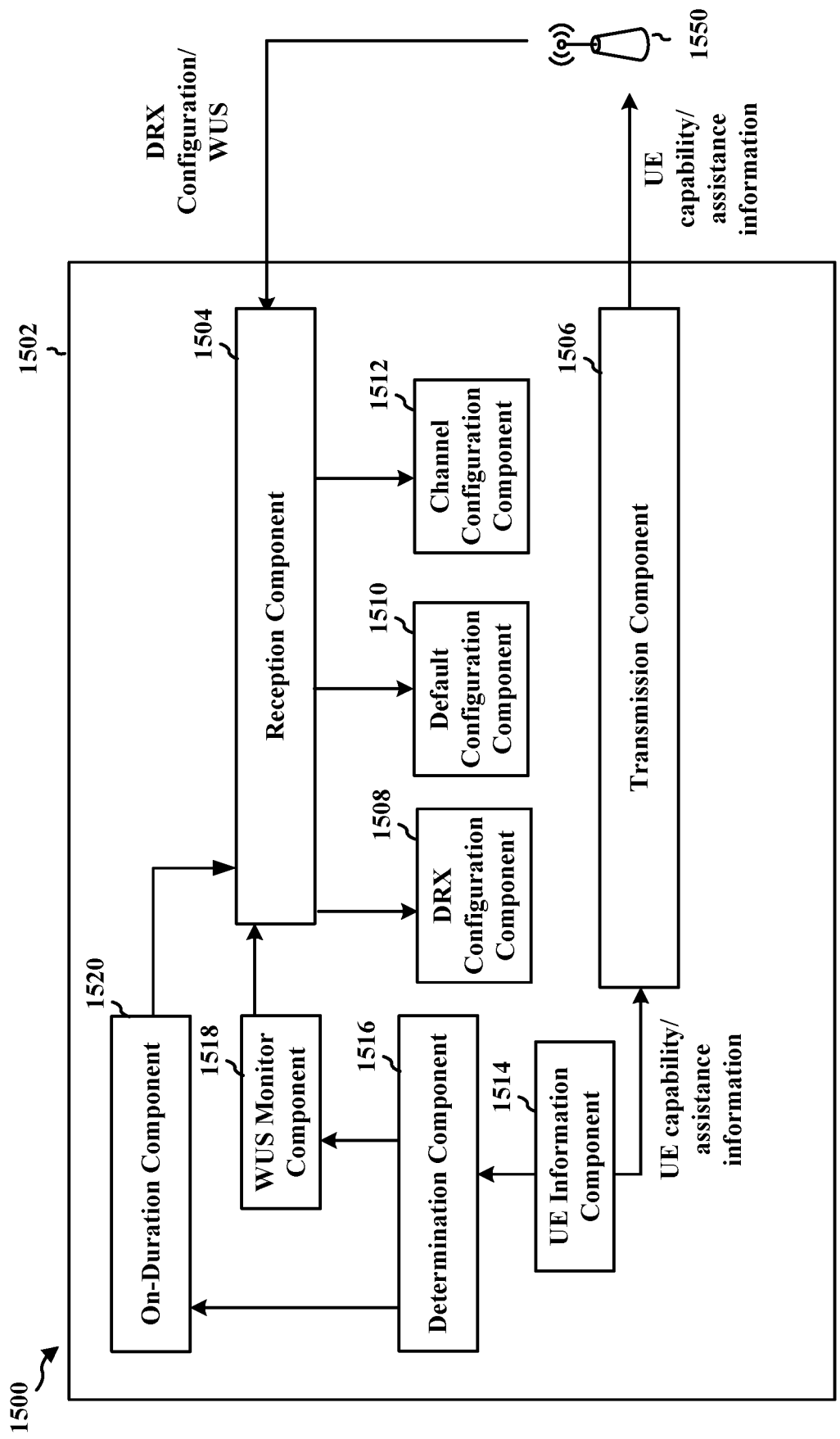
FIG. 15 is a conceptual data flow diagram illustrating the data flow between different means/components in an example apparatus.

FIG. 15 is a conceptual data flow diagram 1500 illustrating the data flow between different means/components in an example apparatus 1502. The apparatus may be a UE apparatus. The apparatus includes a reception component 1504 that receives downlink communication from base station 1550, and a transmission component 1504 that transmits uplink communication to the base station. The apparatus includes a DRX configuration component 1508 configured to receive a configuration for WUS resources to monitor for a WUS during a WUS occasion associated with a DRX operation, e.g., as described in connection with 1404 in FIG. 14. The apparatus may include a default configuration component 1510 configured to receive a configuration for default wake-up information, as described in connection with 1406 in FIG. 14. The apparatus may include a channel configuration component 1512 configured to receive a configuration to monitor a different channel during the active time for the wake-up information, e.g., as described in connection with 1408 of FIG. 14. The apparatus may include a UE information component 1514 configured to transmit a capability of the UE or assistance information of the UE, e.g., as described in connection with 1402 of FIG. 14. The apparatus may include a determination component configured 1516 configured to determine a conflict with a WUS occasion, e.g., as described in connection with 1410 in FIG. 14. The apparatus may include a WUS monitor component 1518 configured to determine an action associated with WUS monitoring during the WUS occasion, e.g., as described in connection with 1414 in FIG. 14. The reception component 1406 and/or WUS monitor component 1518 may be configured to monitor for a WUS and/or monitor for wake-up information to the UE on a different channel. The apparatus may include an on-duration component 1520 configured to start an on-duration or refrain from starting an on-duration, e.g., as described in connection with 1414, 1416, and 11418 of FIG. 14.

The apparatus may include additional components that perform each of the blocks of the algorithm in the aforementioned flowcharts of FIGS. 10 an 14. As such, each block in the aforementioned flowcharts of FIGS. 10 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
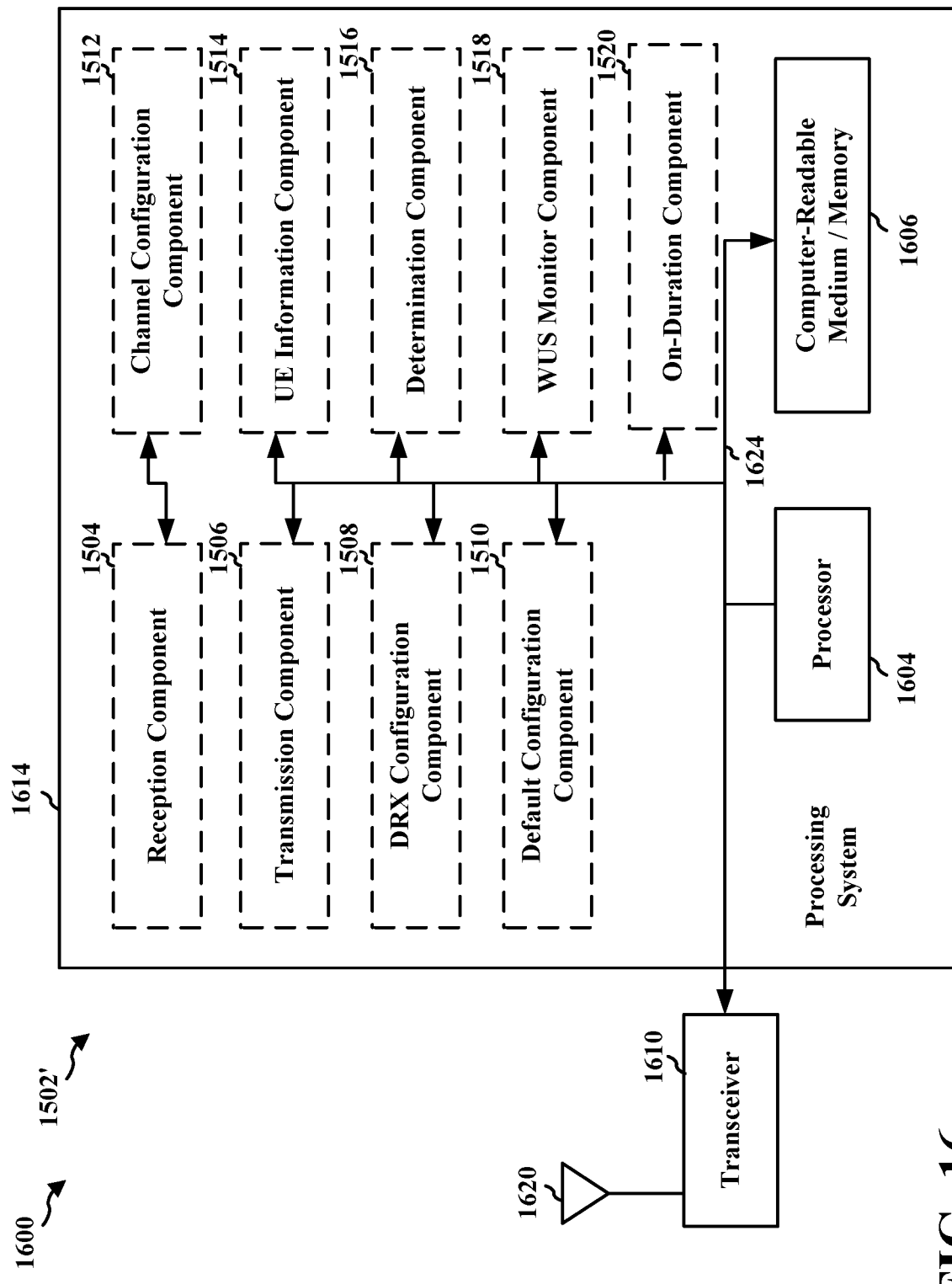
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, 1516, 1518, 1520, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, 1516, 1518, 1520. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359. Alternatively, the processing system 1614 may be the entire UE (e.g., see 350 of FIG. 3).

In one configuration, the apparatus 1502/1502' for wireless communication includes means for receiving. The apparatus 1502/1502' may include means for determining a conflict, e.g., as described in connection with 1410 in FIG. 14. The apparatus 1502/1502' may include means for determining, in response to determining the conflict, an action associated with WUS monitoring during the WUS occasion, e.g., as described in connection with 1414 in FIG. 14. The apparatus 1502/1502' may include means for monitoring the WUS occasion within a WUS monitoring gap provided by a base station, e.g., as described in connection with 1412 in FIG. 14. The apparatus 1502/1502' may include means for transmitting UE capability information or the assistance information to the base station, e.g., as described in connection 1402 in FIG. 14. The apparatus 1502/1502' may include means for starting (or refraining from starting) an on-duration, e.g., as described in connection with 1416 or 1418 in FIG. 14. The apparatus 1502/1502' may include means for receiving a configuration to monitor a different channel for wake-up information, e.g., as described in connection with 1408 in FIG. 14. The apparatus 1502/1502' may include means for receiving a configuration of default wake-up information, e.g., as described in connection with 1406 in FIG. 14. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and may be combined with aspects of other embodiments or teaching described herein, without limitation.

Example 1 is a method of wireless communication at a base station, comprising: configuring a UE with WUS resources to monitor for a WUS during a WUS occasion associated with a DRX operation; determining a conflict with the WUS occasion and an active time for the UE or other resources for the UE having a higher priority than the WUS resources; and in response to determining the conflict, determining an action associated with a WUS transmission.

In Example 2, the method of Example 1 further includes that the action associated with the WUS transmission comprises adjusting transmission of the WUS to not transmit the WUS at the WUS occasion.

In Example 3, the method of Example 1 or Example 2 further includes starting a DRX on-duration associated with the WUS without transmitting the WUS.

In Example 4, the method of any of Examples 1-3 further includes that the base station starts the DRX on-duration using default wake-up information.

In Example 5, the method of any of Examples 1-4 further includes that the default wake-up information is configured for the UE or pre-determined based at least in part on a capability of the UE or assistance information of the UE.

In Example 6, the method of any of Examples 1-5 further includes that the conflict comprises at least a part of the WUS resources overlapping with the active time for the UE.

In Example 7, the method of any of Examples 1-6 further includes that the WUS carries wake-up information comprising at least one of a wake-up indication, a bandwidth part identifier, a carrier identifier, or a request for a channel state report.

In Example 8, the method of any of Example 1-7, wherein the conflict comprises the WUS resources overlapping, at least in part, with the other resources for the UE, and the method further includes that the other resources having the higher priority than the WUS resources include at least one of RRM resources, RLM resources, beam-management resources, synchronization signal resources, PBCH resources, system information block resources, or paging channel resources.

In Example 9, the method of any of Example 1-8 further include that the conflict comprises a gap in time between a start of the WUS occasion and an end of an active time or monitoring occasion of other resources that is smaller than a threshold.

In Example 10, the method of any of Example 1-9 further includes that the threshold is based at least in part on a capability of the UE or assistance information of the UE.

In Example 11, the method of any of Example 1-10 further includes that the action associated with the WUS transmission comprises providing a WUS monitoring gap for the WUS occasion.

In Example 12, the method of any of Example 1-11 further includes that the WUS monitoring gap starts prior to the WUS occasion and extends after the WUS occasion.

In Example 13, the method of any of Example 1-12 further includes receiving UE capability information or assistance information from the UE, wherein a configuration of the WUS monitoring gap is based at least in part on the UE capability information or the assistance information from the UE.

In Example 14, the method of any of Example 1-13 further includes that the base station stops sending and receiving at least one UE-specific signal for the UE other than the WUS during the WUS monitoring gap.

In Example 15, the method of any of Example 1-14 further includes that the at least one UE-specific signal for the UE comprises one or more of a downlink control channel, a downlink shared data channel, an uplink control channel, and an uplink shared data channel, a downlink reference signal, or an uplink reference signal for the UE.

In Example 16, the method of any of Example 1-15 further includes that the action associated with the WUS transmission comprises transmitting wake-up information to the UE on a different channel from the WUS resources configured for the UE.

In Example 17, the method of any of Example 1-16 further includes that the different channel comprises one or more of a downlink control channel and a downlink shared data channel comprised in communication resources during an active time for the UE.

In Example 18, the method of any of Example 1-17 further includes configuring the UE to monitor the different channel during an active time for the wake-up information.

In Example 19, the method of any of Example 1-18 further includes that the action associated with the WUS transmission comprises adjusting transmission of the WUS to refrain from transmitting the WUS at the WUS occasion.

In Example 20, the method of any of Example 1-19 further includes refraining from starting a DRX on-duration associated with the WUS.

In Example 21, the method of any of Example 1-20 further includes starting a DRX on-duration associated with the WUS using default wake-up information.

In Example 22, the method of any of Example 1-21 further includes that the default wake-up information is configured for the UE or pre-determined based at least in part on a capability of the UE or assistance information of the UE.

Example 23 is a device including one or more processors and one or more memories in electronic communication with the one or more processors storing instructions executable by the one or more processors to cause the system or apparatus to implement a method as in any of Examples 1-22.

Example 24 is a system or apparatus including means for implementing a method or realizing an apparatus as in any of Examples 1-22.

Example 25 is a non-transitory computer readable medium storing instructions executable by one or more processors to cause the one or more processors to implement a method as in any of Examples 1-22.

Example 26 is a method of wireless communication at a UE, comprising: receiving a configuration for WUS resources to monitor for a WUS during a WUS occasion associated with a DRX operation; determining a conflict for the WUS occasion and an active time for the UE or other resources for the UE having a higher priority than the WUS resources; and in response to determining the conflict, determining an action associated with WUS monitoring during the WUS occasion.

In Example 27, the method of Example 26 further includes that the action associated with the WUS transmission comprises the WUS monitoring to not monitor for the WUS during the WUS occasion.

In Example 28, the method of Examples 26 or 27 further includes starting a DRX on-duration associated with the WUS without monitoring for the WUS.

In Example 29, the method of any of Examples 26-28 further includes that the UE starts the DRX on-duration using default wake-up information.

In Example 30, the method of any of Examples 26-29 further includes that the conflict comprises at least a part of the WUS resources overlapping with the active time for the UE.

In Example 31, the method of any of Examples 26-30 further includes that the conflict comprises the WUS resources overlapping, at least in part, with the other resources for the UE, and wherein the other resources having the higher priority than the WUS resources include at least one of RRM resources, RLM resources, beam-management resources, synchronization signal resources, PBCH resources, system information block resources, or paging channel resources.

In Example 32, the method of any of Examples 26-31 further includes that the conflict comprises a gap in time between a start of the WUS occasion and an end of the active time or monitoring occasion of the other resources that is smaller than a threshold, and wherein the threshold is based at least in part on a capability of the UE or assistance information of the UE.

In Example 33, the method of any of Examples 26-32 further includes transmitting UE capability information or assistance information to a base station, the UE capability information or the assistance information comprising an indication of a threshold of transition time for transitioning from transmitting or receiving communication during an active time to monitoring for the WUS occasion.

In Example 34, the method of any of Examples 26-33 further includes that the action associated with the WUS monitoring comprises monitoring the WUS occasion within a WUS monitoring gap provided by a base station.

In Example 35, the method of any of Examples 26-34 further includes transmitting UE capability information or assistance information to the base station; and receiving a configuration of the WUS monitoring gap from the base station based on the UE capability information or the assistance information.

In Example 36, the method of any of Examples 26-35 further includes that the UE does not expect to send and receive at least one or more or a downlink control channel, a downlink shared channel, an uplink control channel, an uplink shared channel, a downlink reference signal, or an uplink reference signal during the WUS monitoring gap.

In Example 37, the method of any of Examples 26-36 further includes that the action associated with the WUS monitoring comprises receiving wake-up information from a base station on a different channel from the WUS resources configured for the UE.

In Example 38, the method of any of Examples 26-37 further includes that the action associated with the WUS monitoring comprises adjusting reception of the WUS to refrain from monitoring the WUS at the WUS occasion.

In Example 39, the method of any of Examples 26-38 further includes refraining from starting a DRX on-duration associated with the WUS.

In Example 40, the method of any of Examples 26-38 further includes starting a DRX on-duration associated with the WUS using default wake-up information.

Example 41 is a device including one or more processors and one or more memories in electronic communication with the one or more processors storing instructions executable by the one or more processors to cause the system or apparatus to implement a method as in any of Examples 26-40.

Example 42 is a system or apparatus including means for implementing a method or realizing an apparatus as in any of Examples 26-40.

Example 43 is a non-transitory computer readable medium storing instructions executable by one or more processors to cause the one or more processors to implement a method as in any of Examples 26-40.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    configuring a user equipment (UE) with wake-up signal (WUS) resources to monitor for a WUS during a WUS occasion associated with a discontinuous reception (DRX) operation;
    skipping transmission of the WUS at the WUS occasion based at least in part on a conflict in time with the WUS occasion and a radio resource management (RRM) resource for the UE having a higher priority than the WUS resources, wherein the conflict in time comprises at least a part of the WUS resources for the UE overlapping in time with the RRM resource for the UE; and
    starting a DRX on-duration associated with the WUS without transmitting the WUS at the WUS occasion based at least in part on the conflict in time.

2. The method of claim 1, wherein the base station starts the DRX on-duration using default wake-up information.

3. The method of claim 2, wherein the default wake-up information is configured for the UE or pre-determined based at least in part on a capability of the UE or assistance information of the UE.

4. The method of claim 1, wherein the conflict in time further comprises the WUS resources at least partially overlapping with an active time for the UE.

5. The method of claim 1, wherein the WUS carries wake-up information comprising at least one of a wake-up indication, a bandwidth part identifier, a carrier identifier, or a request for a channel state report.

6. The method of claim 1, wherein another resource having the higher priority than the WUS resources include at least one of a radio link monitoring (RLM) resource or a beam-management resource.

7. The method of claim 1, wherein the conflict in time comprises a gap in time between a start of the WUS occasion and an end of the RRM resource that is smaller than a threshold, and wherein the threshold is based at least in part on a capability of the UE or assistance information of the UE.

8. The method of claim 1, further comprising:
    transmitting wake-up information to the UE on a different channel from the WUS resources configured for the UE, wherein the different channel comprises one or more of a downlink control channel and a downlink shared data channel; and
    configuring the UE to monitor the different channel for the wake-up information.

9. An apparatus for wireless communication at a base station, comprising:
    a memory; and
    at least one processor coupled to the memory and configured to:
        configure a user equipment (UE) with wake-up signal (WUS) resources to monitor for a WUS during a WUS occasion associated with a discontinuous reception (DRX) operation;
        skip transmission of the WUS at the WUS occasion based at least in part on a conflict in time with the WUS occasion and a radio resource management (RRM) resource for the UE having a higher priority than the WUS resources, wherein the conflict in time comprises at least a part of the WUS resources for the UE overlapping in time with the RRM resource for the UE; and start a DRX on-duration associated with the WUS without transmitting the WUS at the WUS occasion based at least in part on the conflict in time.

10. A method of wireless communication at a user equipment (UE), comprising:

receiving a configuration for wake-up signal (WUS) resources to monitor for a WUS during a WUS occasion associated with a discontinuous reception (DRX) operation;

skipping monitoring for the WUS during the WUS occasion based at least in part on a conflict in time for the WUS occasion and a radio resource management (RRM) resource for the UE having a higher priority than the WUS resources, wherein the conflict in time comprises at least a part of the WUS resources for the UE overlapping in time with the RRM resource for the UE; and starting a DRX on-duration associated with the WUS without monitoring for the WUS at the WUS occasion based at least in part on the conflict in time.

11. The method of claim 10, wherein the UE starts the DRX on-duration using default wake-up information.

12. The method of claim 10, wherein the conflict in time further comprises the WUS resources for the UE at least partially overlapping in time with an active time for the UE.

13. The method of claim 10, wherein another resource having the higher priority than the WUS resources include at least one of a radio link monitoring (RLM) resource or a beam-management resource.

14. The method of claim 10, wherein the conflict in time further comprises a gap in time between a start of the WUS occasion and an end of the RRM resource that is smaller than a threshold, and wherein the threshold is based at least in part on a capability of the UE or assistance information of the UE.

15. The method of claim 10, further comprising:

transmitting UE capability information or assistance information to a base station, the UE capability information or the assistance information comprising an indication of a threshold of transition time for transitioning from transmitting or receiving communication during an active time to monitoring for the WUS occasion.

16. The method of claim 10, further comprising receiving wake-up information from a base station on a different channel from the WUS resources configured for the UE.

17. The apparatus of claim 9, wherein the conflict in time further comprises the WUS resources for the UE at least partially overlapping in time with an active time for the UE.

18. The apparatus of claim 9, wherein another resource having the higher priority than the WUS resources include at least one of a radio link monitoring (RLM) resource or a beam-management resource.

19. The apparatus of claim 9, wherein the at least one processor is configured to:

start the DRX on-duration using default wake-up information.

20. The apparatus of claim 9, wherein the conflict in time comprises a gap in time between a start of the WUS occasion and an end of the RRM resource that is smaller than a threshold, and wherein the threshold is based at least in part on a capability of the UE or assistance information of the UE.

21. An apparatus for wireless communication at a user equipment (UE), comprising:

a memory; and at least one processor coupled to the memory and configured to:

receive a configuration for wake-up signal (WUS) resources to monitor for a WUS during a WUS occasion associated with a discontinuous reception (DRX) operation;

skip monitoring for the WUS during the WUS occasion based at least in part on a conflict in time for the WUS occasion and a radio resource management (RRM) resource for the UE having a higher priority than the WUS resources, wherein the conflict in time comprises at least a part of the WUS resources for the UE overlapping in time with the RRM resource for the UE; and start a DRX on-duration associated with the WUS without monitoring for the WUS at the WUS occasion based at least in part on the conflict in time.

22. The apparatus of claim 21, wherein the conflict in time further comprises the WUS resources for the UE at least partially overlapping in time with an active time for the UE.

23. The apparatus of claim 21, another resource having the higher priority than the WUS resources include at least one of a radio link monitoring (RLM) resource or a beam-management resource.

24. The apparatus of claim 21, wherein the conflict in time further comprises a gap in time between a start of the WUS occasion and an end of the RRM resource that is smaller than a threshold, and wherein the threshold is based at least in part on a capability of the UE or assistance information of the UE.

25. The apparatus of claim 21, wherein the memory and the at least one processor are further configured to:

transmit UE capability information or assistance information to a base station, the UE capability information or the assistance information comprising an indication of a threshold of transition time for transitioning from transmitting or receiving communication during an active time to monitoring for the WUS occasion.

26. The apparatus of claim 21, wherein the at least one processor is configured to:

start the DRX on-duration using default wake-up information.

27. The apparatus of claim 21, wherein the at least one processor is configured to:

receive wake-up information from a base station on a different channel from the WUS resources configured for the UE.

* * * * *